United States Patent [19]

Shimoya et al.

[11] Patent Number: 5,245,843
[45] Date of Patent: Sep. 21, 1993

[54] EVAPORATOR

[75] Inventors: Masahiro Shimoya; Yoshiyuki Yamauchi, both of Chita; Etuo Hasegawa, Konan, all of Japan

[73] Assignee: Nippondenso Co., Ltd., Kariya, Japan

[21] Appl. No.: 827,101

[22] Filed: Jan. 29, 1992

[30] Foreign Application Priority Data

| Jan. 31, 1991 | [JP] | Japan | 3-011059 |
| May 17, 1991 | [JP] | Japan | 3-113432 |
| Aug. 6, 1991 | [JP] | Japan | 3-196826 |
| Nov. 19, 1991 | [JP] | Japan | 3-303566 |

[51] Int. Cl.$^5$ ............ F25B 39/02; F25B 41/00; F25B 41/06; F25B 43/00
[52] U.S. Cl. .................... 62/515; 62/83; 62/513; 62/527
[58] Field of Search ......... 62/83, 95, 113, 504, 62/513, 527, 225, 515

[56] References Cited

U.S. PATENT DOCUMENTS

| 2,774,228 | 12/1956 | Farmiain | 62/516 X |
| 3,145,545 | 8/1964 | Jaeger | 62/513 X |
| 3,274,797 | 9/1966 | Kritzer | 62/515 X |
| 3,733,845 | 5/1973 | Lieberman | 62/95 X |
| 3,976,128 | 8/1976 | Patel et al. | 52/527 X |
| 4,370,868 | 2/1988 | Kim et al. | 62/515 X |
| 4,589,265 | 5/1986 | Nozawa | 62/527 X |
| 4,809,518 | 3/1989 | Murayama | 62/225 |

FOREIGN PATENT DOCUMENTS

| 0271084 | 6/1988 | European Pat. Off. |  |
| 0328414 | 8/1989 | European Pat. Off. | 62/515 |
| 3319733 | 12/1983 | Fed. Rep. of Germany | 62/513 |
| 0288871 | 4/1991 | German Democratic Rep. | 62/515 |
| 4740012 | 10/1972 | Japan | 62/83 |
| 0780934 | 8/1957 | United Kingdom | 62/513 |
| 849158 | 9/1960 | United Kingdom |  |
| 2073391 | 10/1981 | United Kingdom | 62/527 |

*Primary Examiner*—Henry A. Bennett
*Assistant Examiner*—Christopher B. Kilner
*Attorney, Agent, or Firm*—Cushman, Darby & Cushman

[57] ABSTRACT

A evaporator for use in a refrigerating cycle in an air conditioning apparatus for a vehicle. The evaporator is provided with a heat exchanger and an evaporator. The heat exchanger has an inlet passageway for leading the refrigerant from the condenser to the evaporator, and an outlet passageway for leading the refrigerant from the evaporator to the compressor. A heat exchange between the inlet refrigerant and the outlet refrigerant at the heat exchanger part takes place, so that a combined gas-liquid state refrigerant is introduced into the outlet passageway of the heat exchanger from the evaporator, whereby a superheating state of the refrigerant is generated in the outlet passageway, and a result, no superheating action occurs in the evaporator, and thus the refrigerant in the evaporator is kept at a constant temperature, whereby the cooling efficiency of the evaporator is increased.

20 Claims, 26 Drawing Sheets

Fig.22-(a)
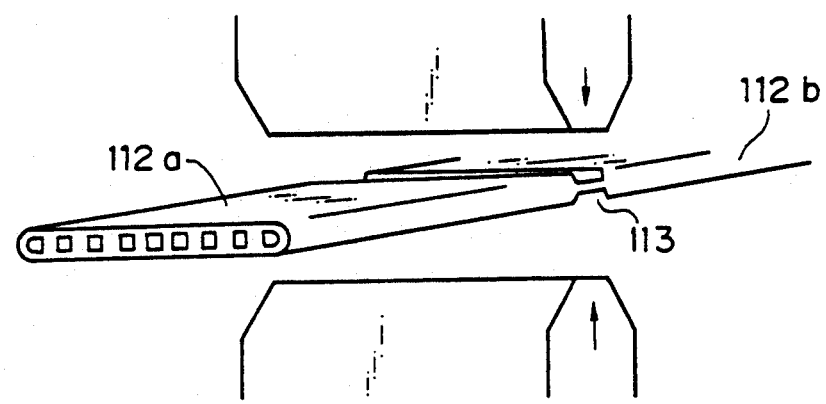
Fig.22-(b)
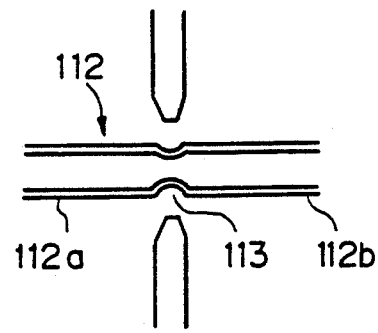

EVAPORATOR

BACKGROUND OF THE INVENTION

1. Field of the Invention

The present invention relates to an evaporator, and more particularly, to an evaporator used for a refrigeration cycle in an air conditioning apparatus for a vehicle.

2. Description of the Related Art

An air conditioning apparatus for a vehicle is generally constructed by a compressor, a condenser, a receiver, an expansion valve and an evaporator, which are located on a recirculation line of a cooling medium for obtaining a refrigeration cycle, and a heat exchange takes place in the condenser with respect to an air directed to a cabin. Namely, a cooling medium from the condenser is expanded at the expansion valve, to obtain a combined gas and liquid state thereof, and then introduced into an evaporator, whereby the gas is evaporated by absorbing heat from the outside while still subjected to the isothermal expansion process, to thereby cool air flowing to the cabin. The evaporated and heated gas is introduced into the compressor under a superheated vaporized condition.

A stacked type evaporator is known, wherein a plurality of evaporating portions are stacked and a common inlet for the refrigerant is provided for dividing the flow of the refrigerant from the inlet into a plurality of refrigerant passageways, to thus obtain a flow of the refrigerant in each of the respective passageways. At the inlet of this type of evaporator, the refrigerant is in a combined air-liquid state, and therefore, it is difficult to evenly distribute the refrigerant to the passageways, and thus the heat exchange efficiency is reduced. To combat this problem, Japanese Examined Patent Publication No. 58-41429 proposed a stacked type condenser, wherein a fixed restriction is provided at each evaporating portion, to thereby allow the liquid state refrigerant condensed and liquidized at the condenser to be introduced into the respective passageways without passing through an expansion valve, to thus obtain an even distribution of the refrigerant.

The refrigerant must be completely gasified at the evaporator, to prevent a liquid state compression at the compressor, and accordingly, a heat exchange at the evaporator is carried out such that the refrigerant is brought to a superheated condition of a predetermined degree of superheat at the outlet of the evaporator. As is well known, the temperature of the refrigerant remains the same during the evaporation, but a superheated vapor condition after the completion of the evaporation can cause an increase in the temperature of the refrigerant, and as a result, a temperature difference will be created across the evaporator between the evaporator inlet at which the refrigerant is evaporating and the evaporator outlet at which the refrigerant is in a super-evaporated state. Such a temperature difference causes the air to be unevenly cooled at different areas of the evaporator, which makes the passenger feel uncomfortable. To combat this difficulty, the Journal of Nippon Denso Technical Disclosures No. 40-076, published in Japan on Mar. 15, 1985, discloses a refrigerating system wherein a high temperature conduit upstream of an expansion valve and a low temperature conduit downstream of the evaporator, at a position between the evaporator and a thermo-sensitive tube, are arranged so that a heat exchange takes place therebetween to thus suppress the superheat generated in the evaporator.

The stacked type evaporator disclosed in Japanese Examined Patent Publication No. 58-41429 suffers from a drawback in that, due to a high pressure inside a tank of the evaporator, the various parts constructing the evaporator must have a high pressure resistance, making the system large in size overall. Further, in this prior art, the evaporator directly receives the liquid state refrigerant as liquidized at the condenser, and no provision is made for controlling the evaporation of the liquid state refrigerant, and thus the system cannot quickly respond to changes in the air conditioning load.

The refrigerating system provided for obtaining a heat exchange between the high temperature conduit upstream of the expansion valve and the low temperature conduit downstream of the evaporator, as disclosed in the Journal of Nippon Denso Technical Disclosures No. 40-076, makes the entire refrigerating system complicated. Also, the direct introduction of the liquid refrigerant condensed at the evaporator lacks a means for a control of the evaporation process, and this makes it difficult to cope with changes in the air conditioning load.

Conversely, the refrigerating system wherein a heat exchange is carried out between the high temperature conduit upstream of the expansion valve and the low temperature conduit downstream of the evaporator also makes the total system complicated. Further, a control of the heat exchange between the conduits is apt to be unstable due to time delays.

SUMMARY OF THE INVENTION

An object of the present invention is to provide an evaporator capable of overcoming the above-mentioned difficulties in the prior art.

According to the present invention, an evaporator is provided for use in a refrigerating cycle for a refrigerant, and comprises:

an inlet for introduction of the refrigerant to be evaporated;

an outlet for removal of the refrigerant after evaporation;

an inlet passageway having a predetermined length and connected to the inlet for allowing a flow of the refrigerant from the inlet;

evaporating means connected to the inlet passageway for obtaining a heat exchange between the refrigerant in and a fluid outside the evaporating means, for an evaporation of the refrigerant therein;

pressure reducing means for throttling the flow of the refrigerant to the evaporating means to thereby reduce a pressure of the refrigerant flowing into the evaporating means;

an outlet passageway having a predetermined length and connected to the outlet, for allowing a flow of the refrigerant in a combined gas-liquid state from the evaporating means;

first heat exchanging means arranged in the inlet passageway for cooling the refrigerant to obtain a liquid state before the refrigerant is introduced into the pressure reducing means, and;

second heat exchanging means arranged in the outlet passageway for heating the refrigerant under a combined gas-liquid state to a superheated state.

BRIEF DESCRIPTION OF THE DRAWINGS

FIG. 22-(a) is a schematic perspective view of orifices in the fourth embodiment shown in FIG. 21;

FIG. 22-(b) is a schematic sectional view of an orifice shown in FIG. 22-(a);

DESCRIPTION OF THE PREFERRED EMBODIMENTS

Figure 15:
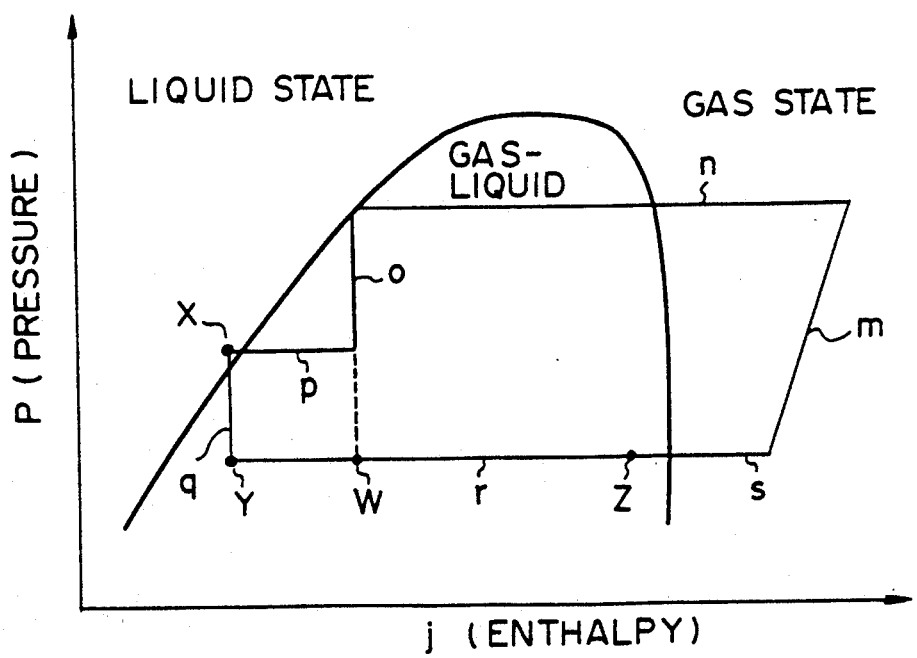
FIG. 15 is a Mollier chart illustrating a state of the refrigerant in the first embodiment.
Figure 16:
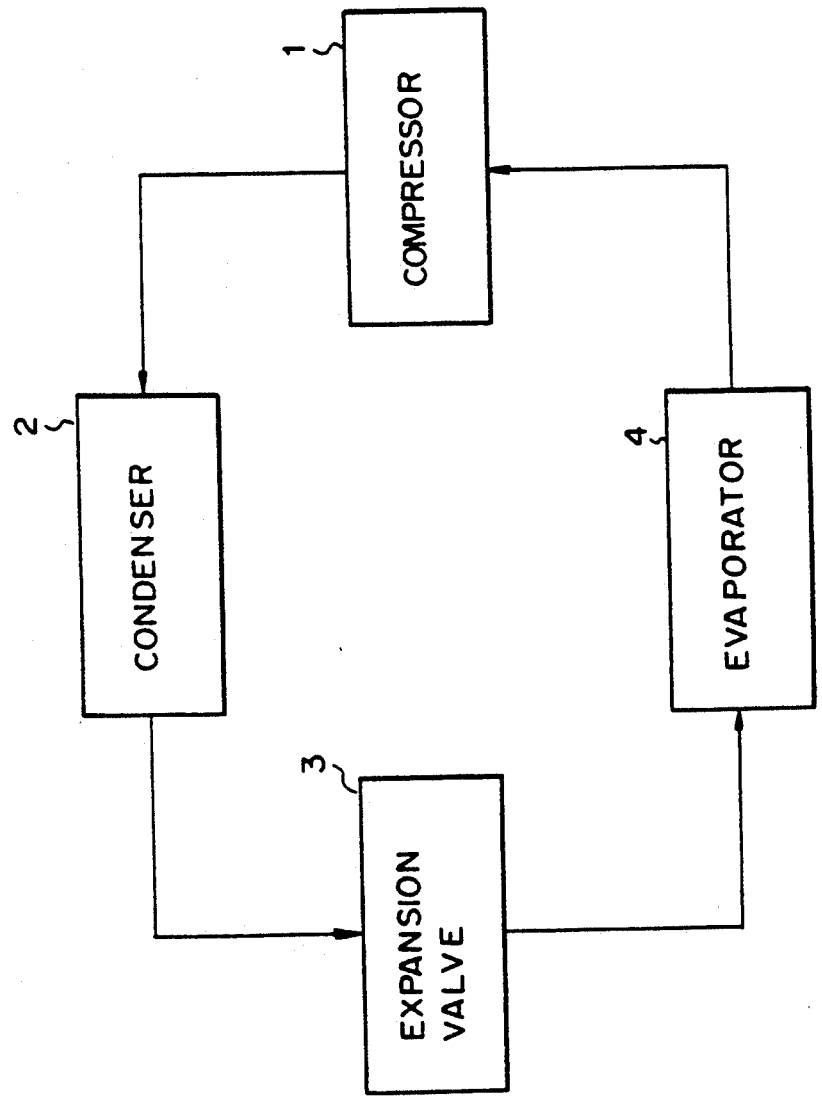
FIG. 16 illustrates a refrigerating cycle for an air conditioning apparatus.

Embodiments of the present invention will be described with reference to the attached drawings, wherein FIGS. 1 to 16 illustrate a first embodiment of the present invention directed to a stacked type evaporator. FIG. 16 shows a simplified outline of a refrigerating cycle carried out in an air conditioning apparatus including a compressor 1, a condenser 2, an expansion valve 3, and an evaporator 4. A refrigerant, in a gaseous state and under a high pressure, from the compressor 1 is introduced into the condenser 2 and is liquidized thereat. The liquid refrigerant from the condenser 2 is then expanded at the expansion valve 3 and introduced into an evaporator 4, whereat the refrigerant is vaporized and brought to a gaseous state. As is well known, an air flow to be air conditioned is brought into contact with the evaporator 4 to carry out a heat exchange between the evaporated refrigerant therein and the air flow.

Figure 1:
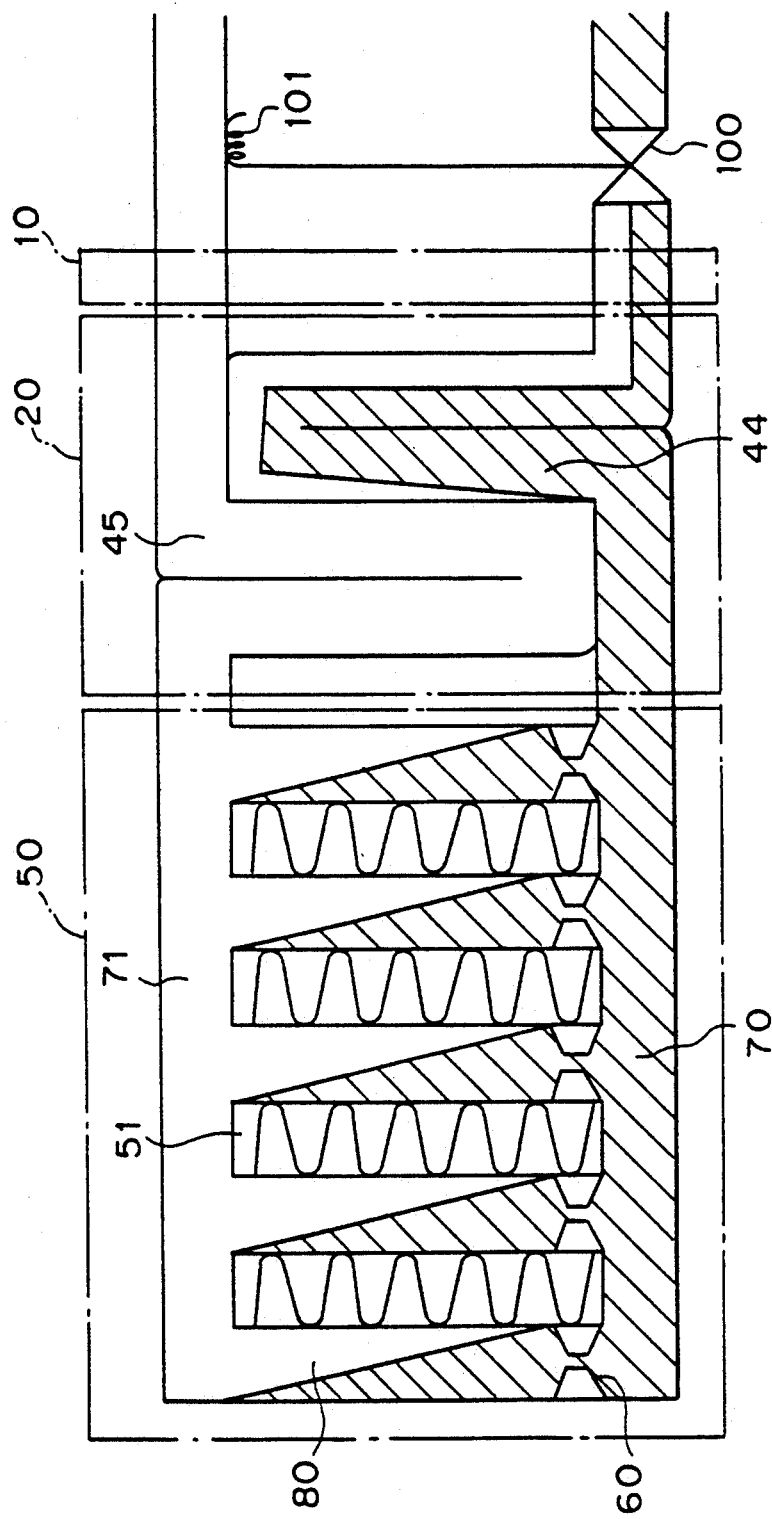
FIG. 1 is a schematic illustration of the operation of the evaporator according to the present invention.

FIG. 1 is a diagram showing a stacked type evaporator used in the refrigerating cycle shown in FIG. 16 in an air conditioning apparatus used for a vehicle. The evaporator is arranged downstream of an expansion valve 100 and is provided with a joint block 10 for receiving the refrigerant from the expansion valve 100 and for discharging evaporated refrigerant outside of the evaporator, a heat exchange section 20 for carrying out a heat exchange between the refrigerant before it is evaporated and the refrigerant after it is evaporated, as will be fully described later, and a refrigerant evaporating section 50 for carrying out a heat exchange between the evaporated refrigerant and the outside air.

Figure 2:
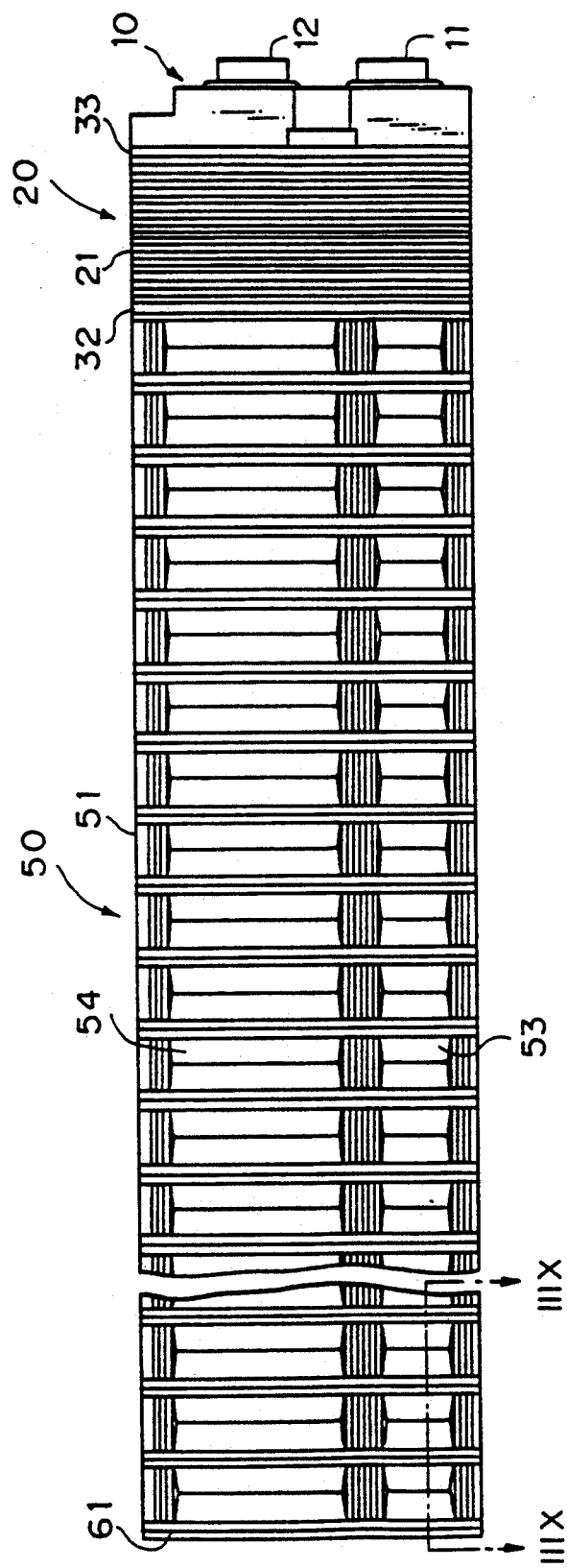
FIG. 2 is a plane view of the evaporator according to the present invention.

As shown in FIG. 2, the joint block 10 is provided with an inlet 11 for an introduction thereto of a refrigerant in a combined gas-liquid state, and an outlet 12 for discharging the refrigerant after it has passed through the evaporating section 50.

Figure 4:
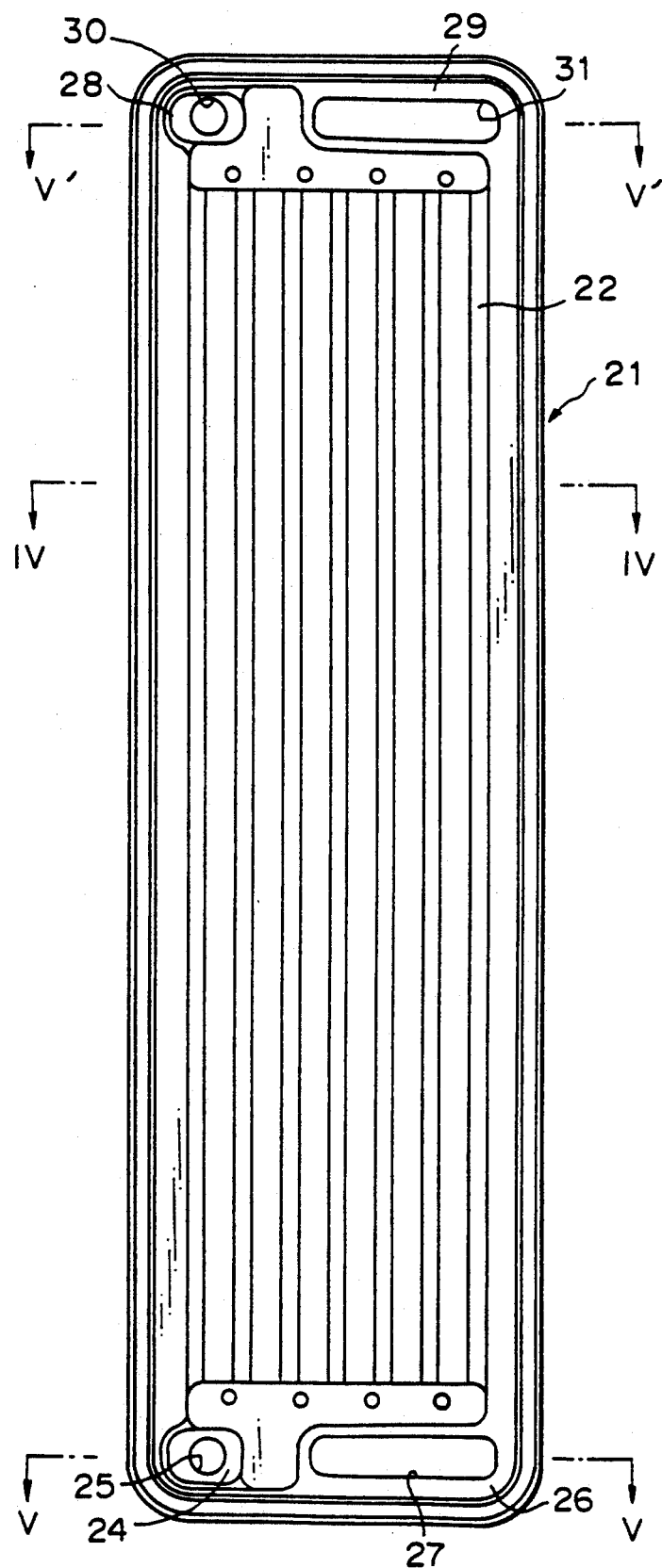
FIG. 4 is a front view of a plate in the heat exchanger shown in FIG. 2.
Figure 5:
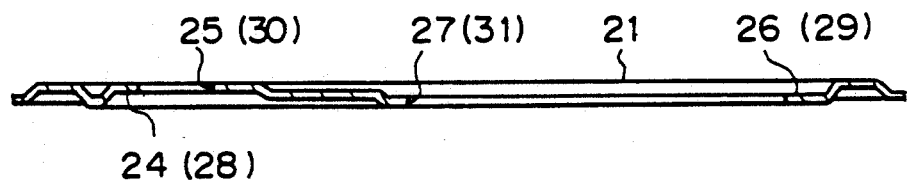
FIG. 5 is a cross-sectional view taken along a line V—V in FIG. 4.
Figure 6:
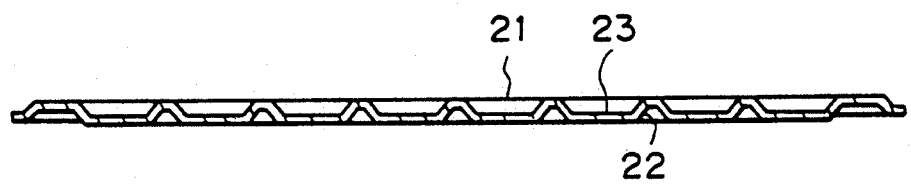
FIG. 6 is a cross-sectional view taken along a line IV—IV in FIG. 4.
Figure 7:
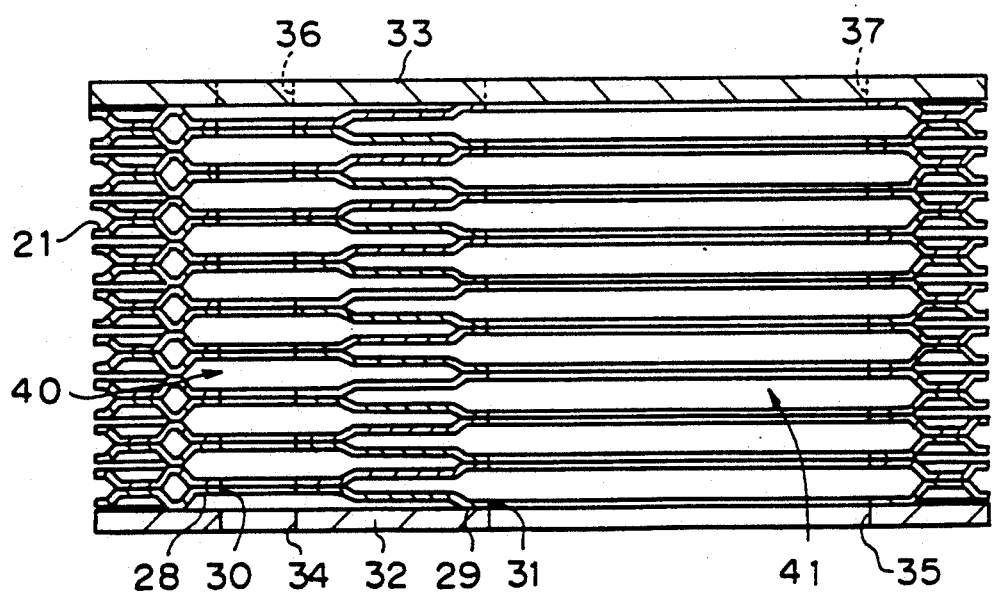
FIG. 7 is cross sectional view of the plates as stacked, taken along a line V—V in FIG. 4.
Figure 8:
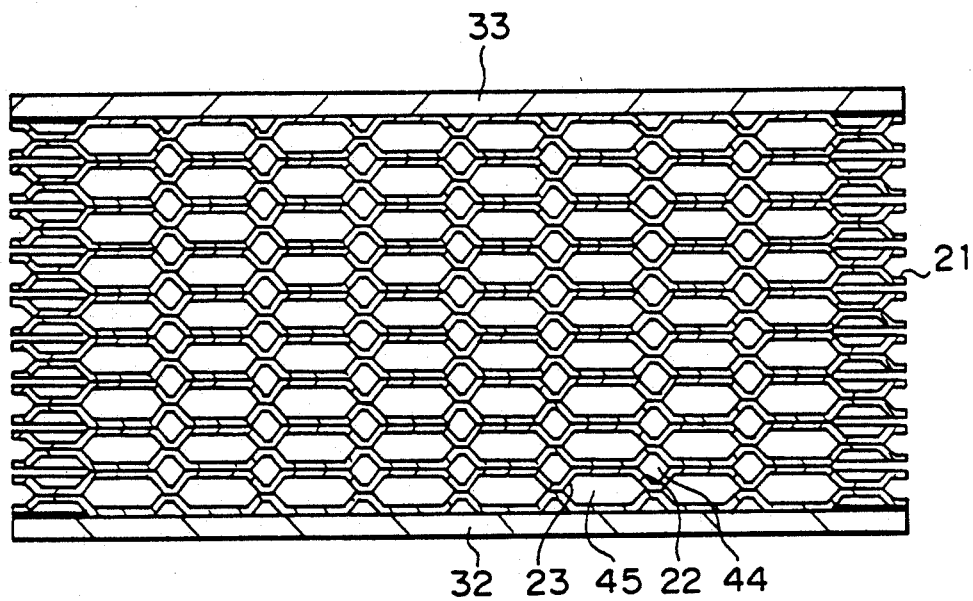
FIG. 8 is cross sectional view of the plates as stacked, taken along a line IV—IV in FIG. 4.

The heat exchange section 20 is constructed by plates 11, as shown in FIG. 4, connected to each other by soldering, to be stacked as shown in FIG. 2 so that flows of refrigerant are obtained between the plates. FIG. 5 is a cross-sectional view of the plate 21 taken along the line V—V (reference numerals are shown without brackets), or taken along the line V'—V' (reference numerals are shown in brackets). FIG. 6 is a cross-sectional view of the plate 21 along the line IV—IV in FIG. 4, FIG. 7 is a cross sectional view of the plates 21 taken along the line V'—V' in FIG. 4, when stacked to construct a heat exchange section 20, and FIG. 8 is cross sectional view of the plates 21 taken along the line IV—IV in FIG. 4, when stacked to construct a heat exchange section 20. As shown in FIG. 4, the plate 21 is provided with openings 25 and 27, and 30 and 31 at vertically symmetrical positions at the top and bottom portions thereof as will be described later, and a plurality of vertically extending U-shaped grooves separated by vertically extending flat portions, which grooves form passageways for the refrigerant when the plate 21 is stacked, as fully described later. As shown in FIGS. 4 and 6, the plate 21, except at the top and bottom ends thereof, is provided with horizontally spaced, vertically extending U-shaped grooves and vertically extending flat portions separating the U-shaped grooves. As a result, vertically extending grooves 22 having a U-shaped cross-section are formed on one side (lower side in FIG. 6) of the plate as shown in FIG. 6, and therefore, on the opposite side (upper side in FIG. 6) of the plate 21, vertically extending grooves 23 are formed on the flat portions separating the adjacent U-shaped grooves, as shown in FIG. 6. As shown in FIGS. 4 and 5, the plate 21, at the bottom and on one side (lower side in FIG. 5) thereof, has a recess 24 defining an opening 25 for receiving the refrigerant from the inlet 11 in the joint block 10, and at the bottom end of the plate 21, a flat recess 26 is also formed on the other side (upper side in FIG. 5) thereof, which portion 26 forms a horizontal elongated opening 27 for discharging the refrigerant from the refrigerant vaporizing section 50 to the outlet 12 in the joint block 10.

Similar to the bottom portion thereof, the top portion of the plate 21 has a flat portion 28, and an opposite flat recess 29, defining openings 30 and 31, respectively, having the same shape as that of the openings 25 and 27, respectively. (Refer to bracketed numerals in FIG. 5.)

As shown in FIG. 7, which shows the stacked condition taken along the line V'—V' in FIG. 4, and in FIG. 8, which shows the stacked condition taken along the line IV—IV in FIG. 4, the plates are stacked between a pair of end plates 32 and 33 such that two adjacent plates are opposite each other. Furthermore, the end plate 32 adjacent to the refrigerant evaporating portion 50 defines holes 34 and 35 aligned with the holes 30 and 31, respectively, in the plates 21 as stacked. Conversely, the end plate 33 adjacent to the joint block 10 defines holes 36 and 37 aligned with the holes 25 and 27, respectively, in the plates 21 as stacked.

Figure 11:
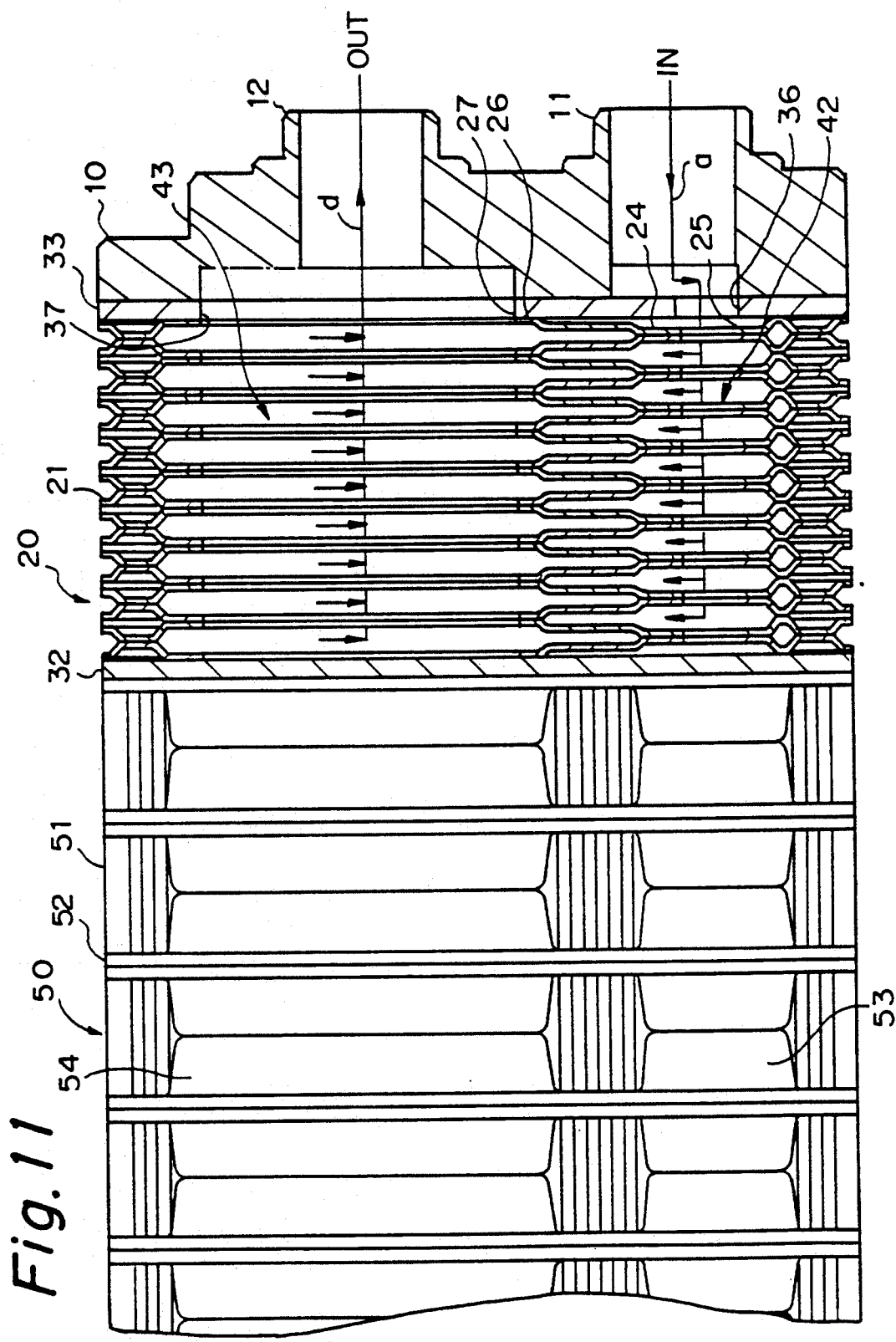
FIG. 11 is a cross-sectional view taken along a line IX—IX in FIG. 3.

The stacked construction of the plates 21 as shown in FIG. 7 provides, at the top portion of the heat exchange section 20, a horizontally extending cavity 40 (below, top inlet refrigerant tank) via the aligned openings 30 in the flat portions 28, and a horizontally extending cavity 41 (below, top outlet refrigerant tank) via the aligned openings 31 on the flat portions 29. Similarly, as shown in FIG. 11, the stacked construction of the plates 21 provides, at the bottom portion of the heat exchange section 20, a horizontally extending cavity 42 (below, bottom inlet refrigerant tank) via the aligned openings 25 in the flat portions 24, and a horizontally extending cavity 43 (below, bottom outlet refrigerant tank) via the aligned openings 27 on the flat portions 26. Furthermore, as shown in FIG. 8, the middle portion of the plates 21 as stacked forms, by the grooves 22 on the facing sides of the adjacent plates 21, a plurality of horizontally spaced, vertically extending passageways 44 (below, refrigerant inlet passageways) connecting the top inlet refrigerant tank 40 and the bottom refrigerant inlet tank 42. In a similar way, the middle portion of the plates 21 as stacked forms, by the grooves 23 on the facing sides of the adjacent plates 21, a plurality of horizontally spaced, vertically extending passageways 45 (below, refrigerant outlet passageways) connecting the top outlet refrigerant tank 41 and the bottom refrigerant outlet tank 43. As will be clear from the above explanation, each plate 21 of the heat exchange section 20 forms on one major side thereof a plurality of horizontally spaced, vertically extending grooves 22 which, in cooperation with facing grooves 22 on the facing side of the adjacent plate 21, form a plurality of horizontally spaced, vertically extending refrigerant inlet passageways 44, and forms on the other major side thereof a plurality of horizontally spaced, vertically extending grooves 23 which, in cooperation with facing grooves 23 on the facing side of the adjacent plate 21, form a plurality of horizontally spaced, vertically extending refrigerant outlet passageways 45.

Figure 3:
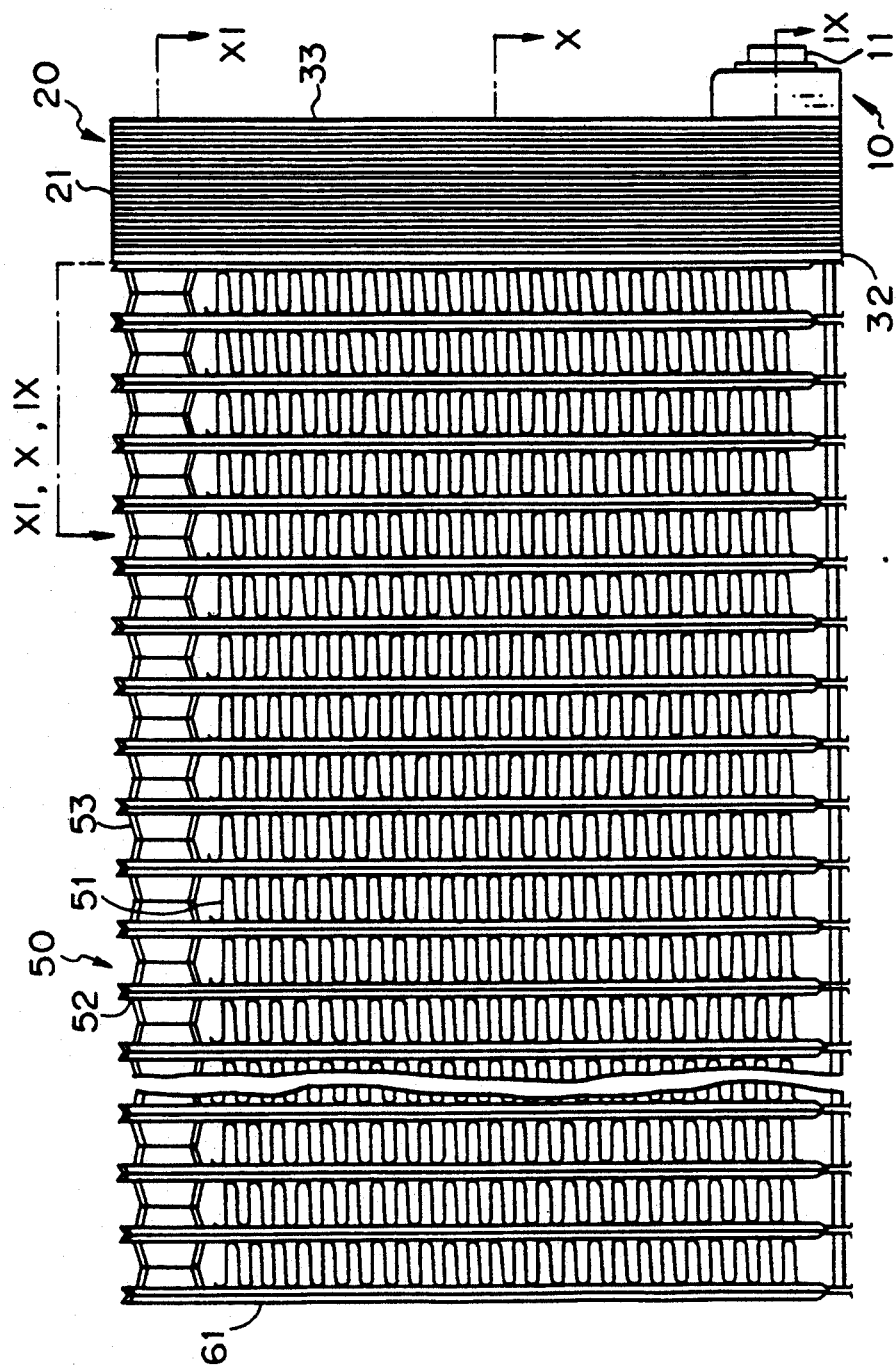
FIG. 3 is a side view of evaporator according to the present invention.
Figure 9:
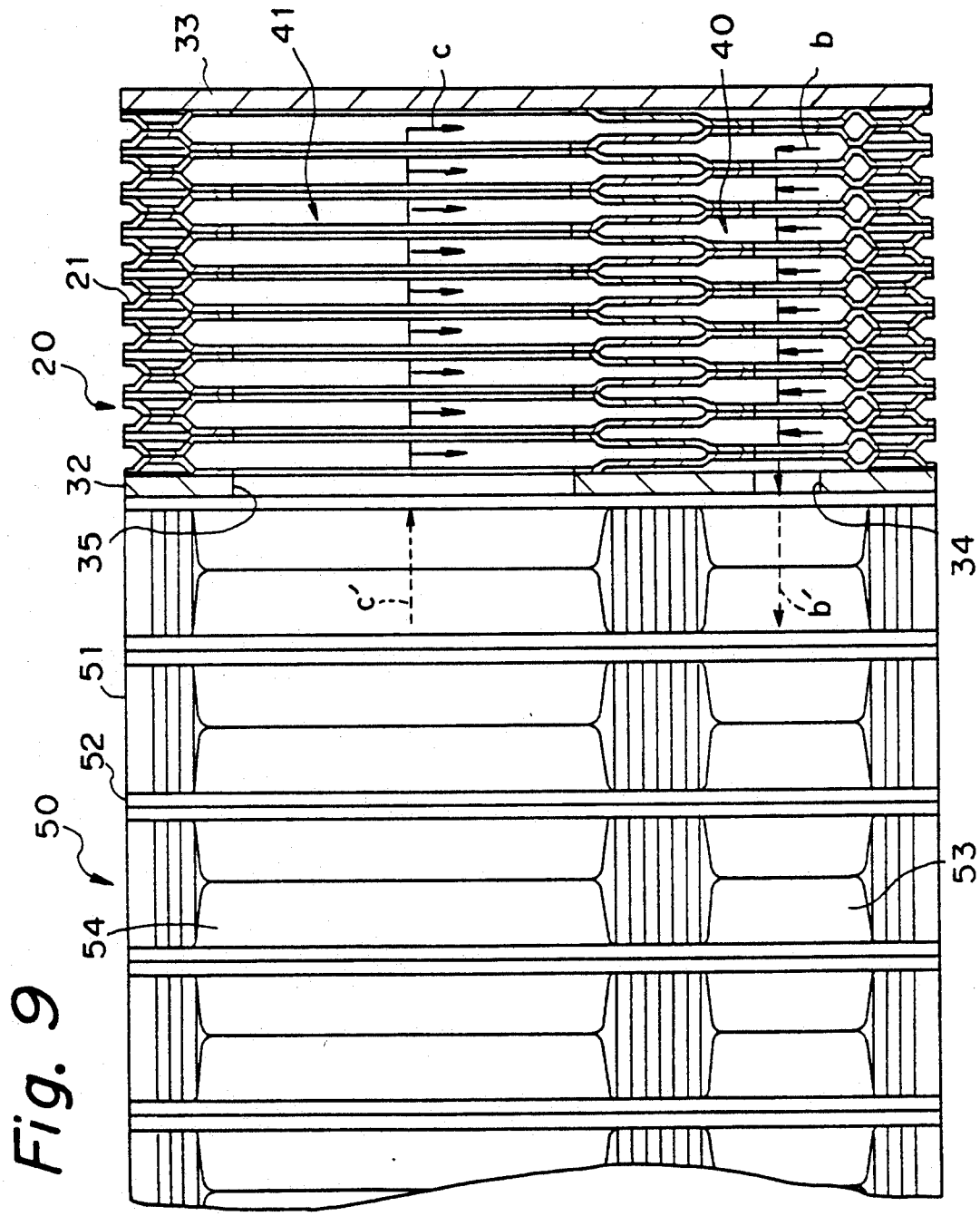
FIG. 9 is a cross-sectional view taken along a line XI—XI in FIG. 3.
Figure 10:
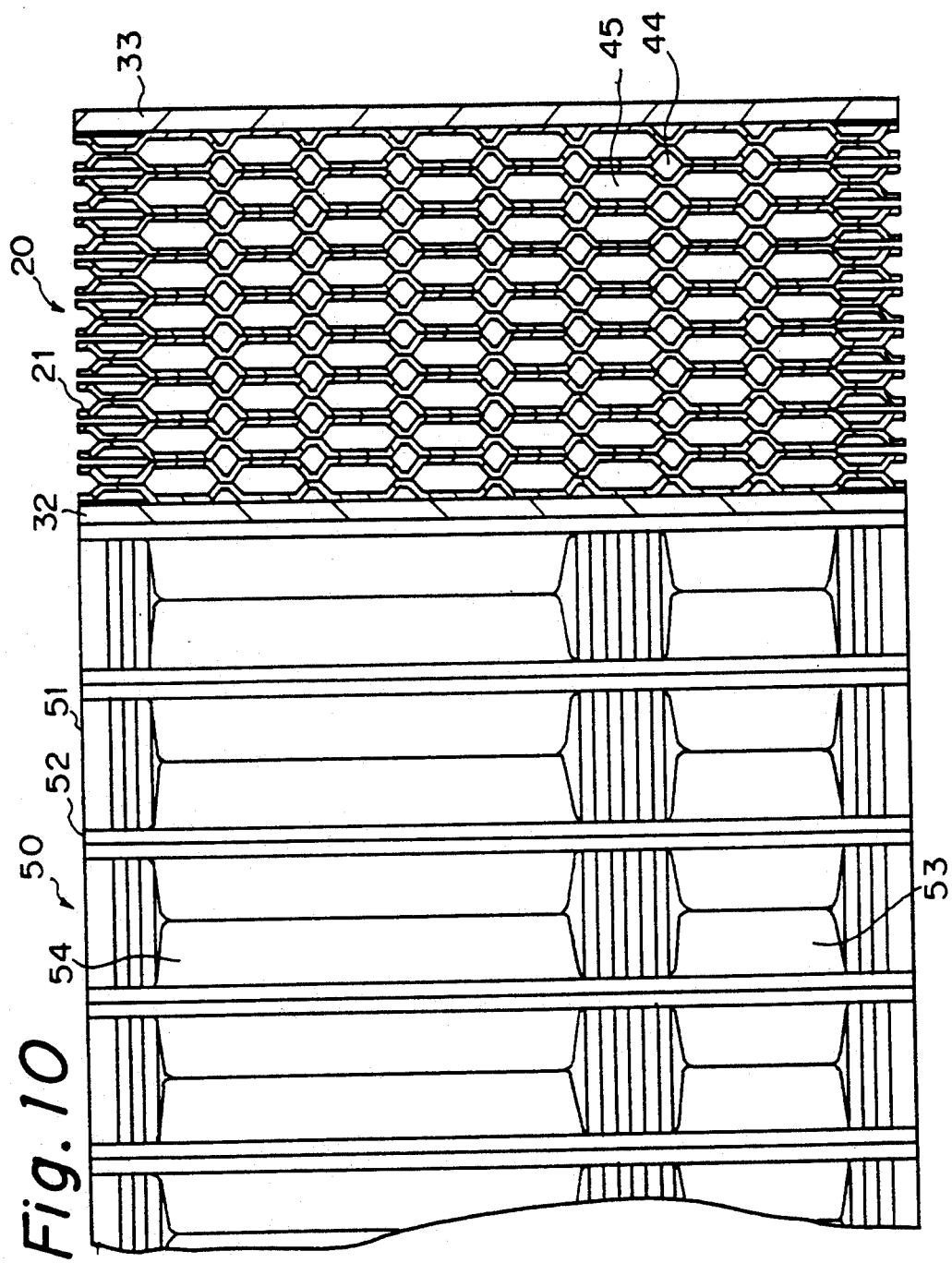
FIG. 10 is a cross-sectional view taken along a line X—X in FIG. 3.

The flow of the refrigerant in the heat exchange section 20 of the evaporator 4 will be explained with reference to FIGS. 9, 10 and 11, which are cross sectional views taken along the lines XI—XI, X—X and IX—IX, respectively, in FIG. 3. The refrigerant from the inlet opening 11 of the joint block 10 (below, inlet refrigerant) is introduced into the bottom inlet refrigerant tank 42 as shown by an arrow a in FIG. 11, and is directed to and moved upward in the inlet refrigerant passageways 44 formed between plates 21 at the facing sides thereof, as shown in FIG. 10. The refrigerant from the inlet refrigerant passageways 44 is introduced into the top inlet refrigerant tank 40 as shown by an arrow b, and is delivered to the refrigerant evaporating section 50 as shown by an arrow b', in FIG. 9. The flows in the refrigerant evaporating section 50 will be described later. The refrigerant is evaporated at the refrigerant evaporating section 50 as shown by an arrow c' (below, outlet refrigerant) and then introduced into the top outlet refrigerant tank 41 as shown by an arrow c' in FIG. 9 and directed to and moved downward in the outlet refrigerant passageways 45 formed between the plates 21 at the facing sides thereof, as shown in FIG. 10. The refrigerant from the outlet refrigerant passageways 45 is introduced into the bottom outlet refrigerant tank 43 as shown by an arrow d, and is emitted from the outlet opening 12 of the joint block 10 and directed, via the thermo-sensitive valve 101, to the compressor 1 shown in FIG. 1. As will be clear from the above description, a heat exchange takes place between the inlet refrigerant in the passageway 44 and the outlet refrigerant in the passageway 45. The details of this heat exchange between the inlet refrigerant and the outlet refrigerant will described later.

Figure 12:
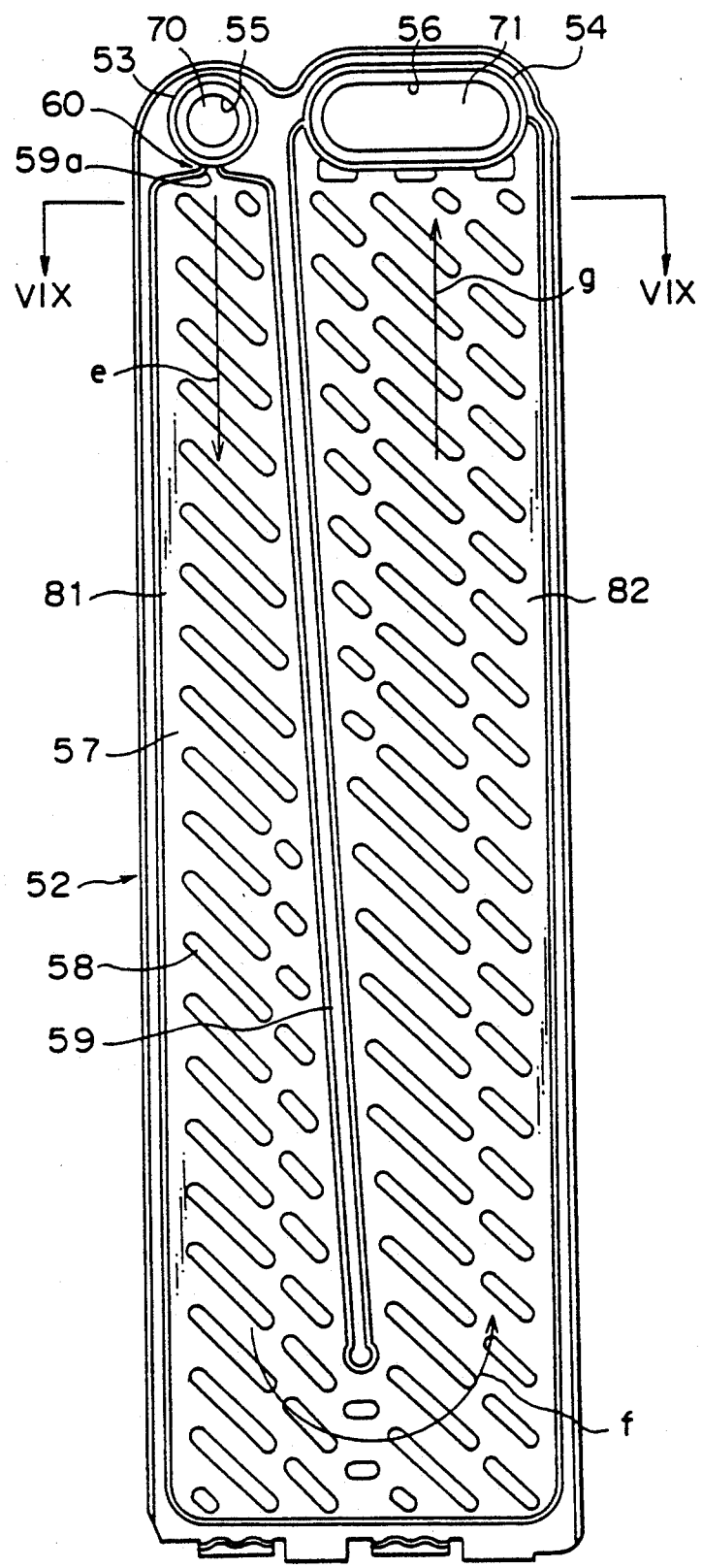
FIG. 12 is a front view of a plate in the evaporator shown in FIG. 2.
Figure 13:
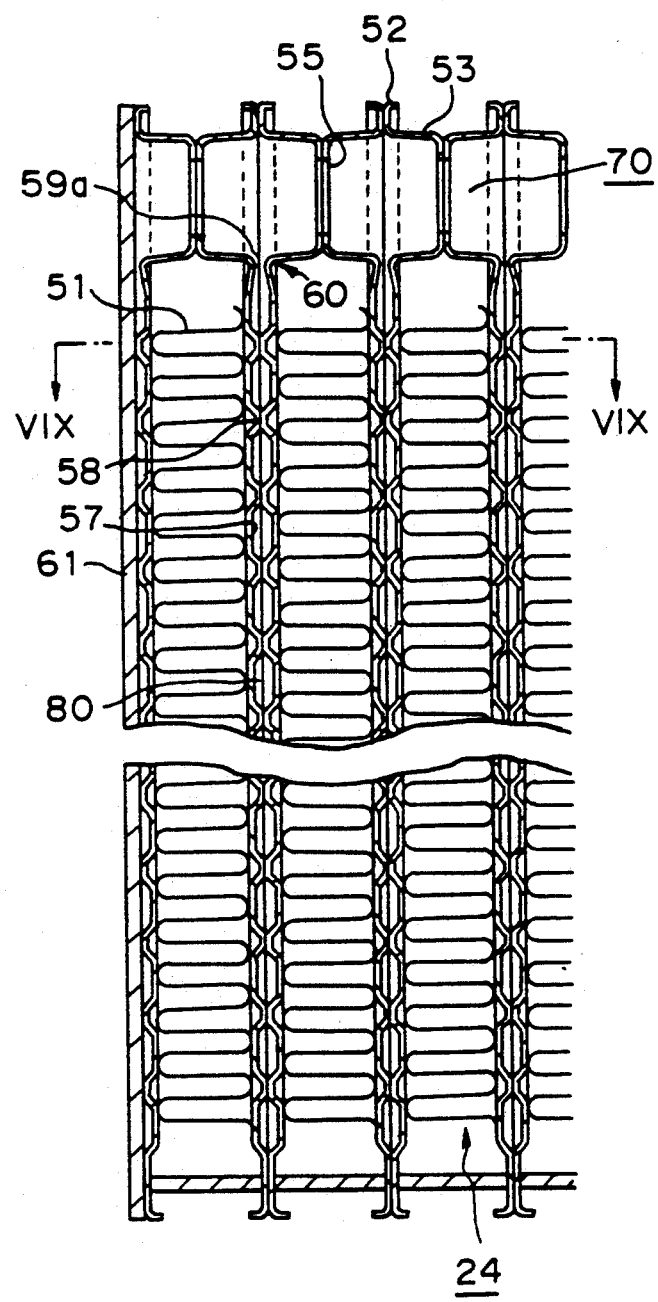
FIG. 13 is a cross sectional view taken along a line IIIX—IIIX in FIG. 2.
Figure 14:
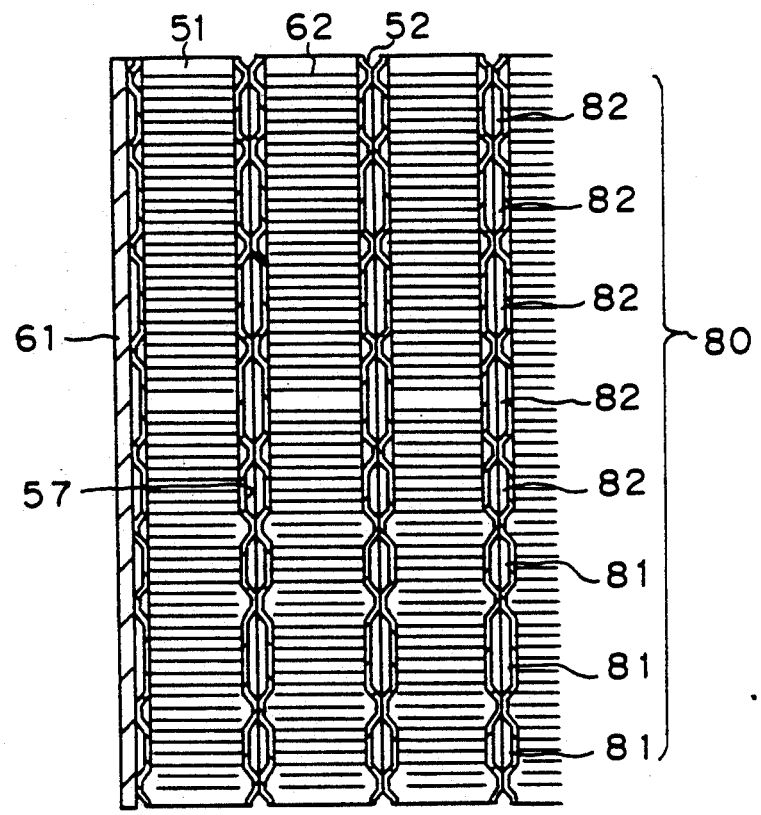
FIG. 14 is a cross sectional view taken along a line VIX—VIX in FIG. 13.

The refrigerant evaporating section 50 is constructed by corrugated fins 51 (below, fin) and plates 52, which are stacked and connected to each other by soldering as shown in FIG. 13, which is a cross-sectional view taken along the line IIIX—IIIX in FIG. 2, and in FIG. 14 which is a cross sectional view taken along the line VIX—VIX in FIG. 12 or 13. As shown in FIG. 12, the plate 52 has an elongated, substantially rectangular shape, and at the top portion thereof, has a tubular outwardly raised, cup shaped portion 53 having a substantially circular cross sectional shape and constructing an inlet tank 70, having at an outer end thereof a circular opening 55, and a tubular outwardly raised portion 54 constructing an outlet tank having an elongated rectangular cross-sectional shape, and at the outer end thereof, having an elongated opening 54. As shown in FIG. 13, when the plates are stacked, a pair of plates 52 adjacent to each other are arranged in a face to face contacting condition so that the tubular raised portions 53 and 54 are extended and together form a space therebetween. Further, between the pairs of the plates adjacent to other, raised portions 53 and 54 of a plate of one of the adjacent pairs of plates is in contact with raised portions 53 and 54, respectively, of the plate of the other pair of plates, and as a result, when the plates 52 are stacked, a horizontally extending inlet tank 70 having a substantially circular tubular shape is formed by the tubular portions 53 connected in series with each other, and a horizontally extending outlet tank 71 having an elongated tubular shape is formed by tubular portions 54 connected in series with each other. The inlet tank 70 is communicated with the top inlet refrigerant tank 40 of the heat exchange section 20, and the outlet tank 71 is communicated with the top outlet refrigerant tank 41 of the heat exchange section 20.

The plates 52 are slightly outwardly projected at the middle portions thereof, so that an inner recess 57 delimited by a partition wall 59 as a substantially closed loop is created, whereupon when the plates are stacked, refrigerant passageways 80 are formed between the inner side of the plates 52 facing inward. A plurality of inclined ribs 58 are formed at the inner recess 57 of the plate 52, and have a U-shape cross-section extending inward for improving the heat exchange of the refrigerant, and a central partition 59 for initially directing the refrigerant downward and then changing the direction thereof upward toward the outlet tank 71. The central partition 59 is inclined such that the passageway has a varied width which is initially small and then increases in the direction of the refrigerant flow, as shown by an arrow f. As a result, a constant pressure loss of the refrigerant is maintained regardless of the expansion of the refrigerant, which is further increased as the evaporation process proceeds. A restricted groove 59a is formed between the tubular portion 53 and the inner recess 57, which allows a flow of the refrigerant in the inlet tank 53 into the inner recess 57 via the groove 53.

The refrigerant evaporating section 50 is composed of a stack of plates 52 arranged between the end plate 61 and the end plate 32 of the heat exchange section 20, in such a manner that one pair of adjacent plates 52 face inward to each other, to form a refrigerant passageway 80 therebetween. The grooves 59a on the plates of each pair of inwardly facing plates creates throttle portions 60 for restricting the refrigerant passageway 80, to thus reduce the pressure of the refrigerant introduced into the evaporation passageway 80. Corrugated fins 51 are arranged between the facing rear sides of the plates opposite to the refrigerant passageways, and connected thereto by soldering. Noted, in the inward facing opposite pair of the plates 52, the inclined cross ribs 58 on one of the inner sides of the inward facing pairs extend so that they cross the inclined cross ribs 58 on the other plate of the pair.

The flow in the refrigerant evaporation section 50 constructed by the stack of the plates 52 is shown by arrows e, f and g in FIG. 12. The refrigerant from the top inlet refrigerant tank 40 of the heat exchange section 20 is introduced into the inlet tank 70 formed inside the cup portions 53 connected in series by the plates 52 when stacked. The refrigerant in the inlet tank 70 is distributed to the orifices 60 arranged along the horizontal length of the evaporating section 50 between the adjacent pairs of the plates 52 facing inward, and is introduced into the passageway 80 formed between the facing inner recesses 57 of the adjacent plates 52, initially downwardly as shown by the arrow e in FIG. 12. The flow then changes direction upward, as shown by the arrow f, and finally is introduced, as shown by the arrow q, into the outlet tank 71 formed by the tubular projections 54 of the plates 52 connected in series when stacked. When the refrigerant passes through the passageways 80 formed by the recess 57 of the inwardly facing pairs of the plates 52, the arrangement of the inclined ribs 58, which are facing and cross each other, allows the refrigerant to be evenly distributed along the entire region of the passageway 80, to thereby obtain an effective heat exchange. Noted, in FIG. 14, reference a numeral 81 is a portion of the passageway 80 between the facing inner recesses 57 of the adjacent pair of plates 52 where in the refrigerant flows downward as shown by the arrow e in FIG. 12, and reference numeral 82 is a portion of the passageway 80 wherein the refrigerant flows upward as shown by the arrow q in FIG. 12. It should be also noted that the passageway 80 between the facing inner recesses 57 of the adjacent pair of the plates 52 is referred to below as an evaporation passageway 80. A heat exchange between the refrigerant in the evaporation passageway 80 and the air flow in contact with the fin 51 occurs, to evaporate the refrigerant and obtain a isothermal expansion thereof.

A condition of the refrigerant in the evaporator in the first embodiment of the present invention will now be explained with reference to FIGS. 1 and 15. FIG. 15 illustrates a Mollier diagram showing the status of the refrigerant in the evaporator. The refrigerant in a gaseous state is subjected to a high pressure by a compression in the compressor (line m in FIG. 15), and is introduced into the condenser to cause the refrigerant to be subjected to a heat emission, and thus be changed from a gas to a liquid (line n in FIG. 15). In a usual refrigerating cycle, the refrigerant is expanded at the expansion valve on a line o toward a point w, so that the refrigerant is in a combined gas-liquid condition at the inlet of the evaporator, which makes it difficult for the refrigerant to be evenly distributed in the evaporator in the prior art. According to the first embodiment of the present invention, at the heat exchange section 20, a heat exchange takes place between the inlet refrigerant and the outlet refrigerant having a temperature lower than the temperature of the inlet refrigerant, due to the provision of the orifice portions 60 at the inlet of the evaporator passageway 80 from the inlet tank portion 70, as fully explained later. As a result, a condition of the inlet refrigerant is changed along a line p toward a point x, to obtain a cooling of the cooling medium. Accordingly, the refrigerant from the inlet tank 70 of the evaporating section 50 can be evenly distributed to the evaporation passageways 80 between the inward facing adjacent plates 52. The orifices 60 at the inlet of the evaporation passageways 80 allow the refrigerant to be cooled to a point Y having a low temperature, along a line q, to obtain a combined gas-liquid condition, and thus a heat exchange of the refrigerant with respect to the air takes place via the fins 51, permitting the refrigerant to be evaporated (line r in FIG. 15). Before the evaporation is completed the refrigerant (outlet refrigerant) is collected at the outlet tank 71 of the refrigerant evaporating section 50, and is delivered to the heat exchange section 20 at point z. When passed through the outlet passageways 45 between the plates 21 of the heat exchange section 20, the refrigerant (outlet refrigerant) is subjected to a heat exchange with the inlet refrigerant passing through the inlet passageways 44 between the plates 21, so that the refrigerant becomes a super-heated vapor on a line s in FIG. 15 at a position located outside of the saturating curve, and is supplied to the compressor via the thermo-sensitive tube 101.

The above operation of the evaporator will now be explained with reference to FIG. 1. When passing through the inlet refrigerant passageway 44, the refrigerant (inlet refrigerant) from the expansion valve 100 in the combined gas-liquid state is subjected to a heat exchange with the low temperature refrigerant (outlet refrigerant) passing through the outlet refrigerant passageway 45, which causes the inlet refrigerant to be cooled to a liquid state, and is then introduced into the inlet tank 70. Noted, a hatched portion in FIG. 1 is the part of the refrigerant in the liquid state. The refrigerant in the inlet tank 70 is evenly introduced into the evaporation passageways 80 via the respective orifices 60, with a reduced pressure to provide a combined liquid-gas state at a low temperature, which is subjected to a heat exchange with the air by way of the fins 51, whereby the refrigerant is gasified while being maintained to an isothermal condition. Just before it is gasified, the refrigerant is introduced into and collected at the outlet tank 71 of the refrigerant evaporating section 50, and is directed into the outlet refrigerant passageways 45 of the heat exchange section 20. The outlet refrigerant at the passageways 45 is subjected to a heat exchange with the inlet passageway 44, and is heated to obtain a super-heated vapor. Thus, the heat exchange of the refrigerant at the each evaporation passageway 80 does not reach the superheated condition, as this super-heating takes place in the heat exchange part 20, and thus the refrigerant is maintained at a constant temperature at the evaporating section 50.

As described above, according to the first embodiment of the present invention, the provision of the heat exchange section 20 and the orifices 60 causes the inlet refrigerant in a gas-liquid state and the outlet refrigerant in a combined gas-liquid state to be subjected to a heat exchange whereby the refrigerant is evenly supplied to the each of the evaporation passageways 80, while maintaining a constant temperature at the each of the evaporation passageways 80. The even supply of the refrigerant increases the heat exchange efficiency, which allows the refrigerant to be subjected to an isothermal evaporation whereby the refrigerant can evenly heat exchanged with the air, to thus obtain a constant temperature of the air after contact with the fins 51.

According to the embodiment of the present invention, on one side of the stacked type evaporation, which is of a conventional design, the heat exchange section 20 is arranged, and on the side of the heat exchange section 20 remote from the evaporator, the expansion valve 100 and the thermo-sensitive tube 101 are arranged, and such an arrangement allows a heat exchange to take place between the expansion valve 100 and the thermo-sensitive tube 101, resulting in an improved control performance. In addition, the evaporator according to the present invention can be incorporated into a conventional refrigerating system without changing and complicating the system. The provision of the orifices 60 does not require the parts to have a high pressure resistance. Furthermore, a reverse direction of the flow of the refrigerant at the outlet refrigerant passageways 45 of the heat exchange section with respect to the direction of the flow of the refrigerant at the inlet refrigerant passageways 44 can improve a heat exchange efficiency between the inlet refrigerant and the outlet refrigerant. Finally, a selective closure of a desired opening 25, 27, 30 or 31 in the refrigerant tank 40, 41, 42 or 43 by a blind plug allows the passing of the refrigerant in the evaporating passageway 80 to be suitably changed, permitting the performance of the evaporation, such as the degree of the superheated condition, to be desirably adjusted.

Figure 17:
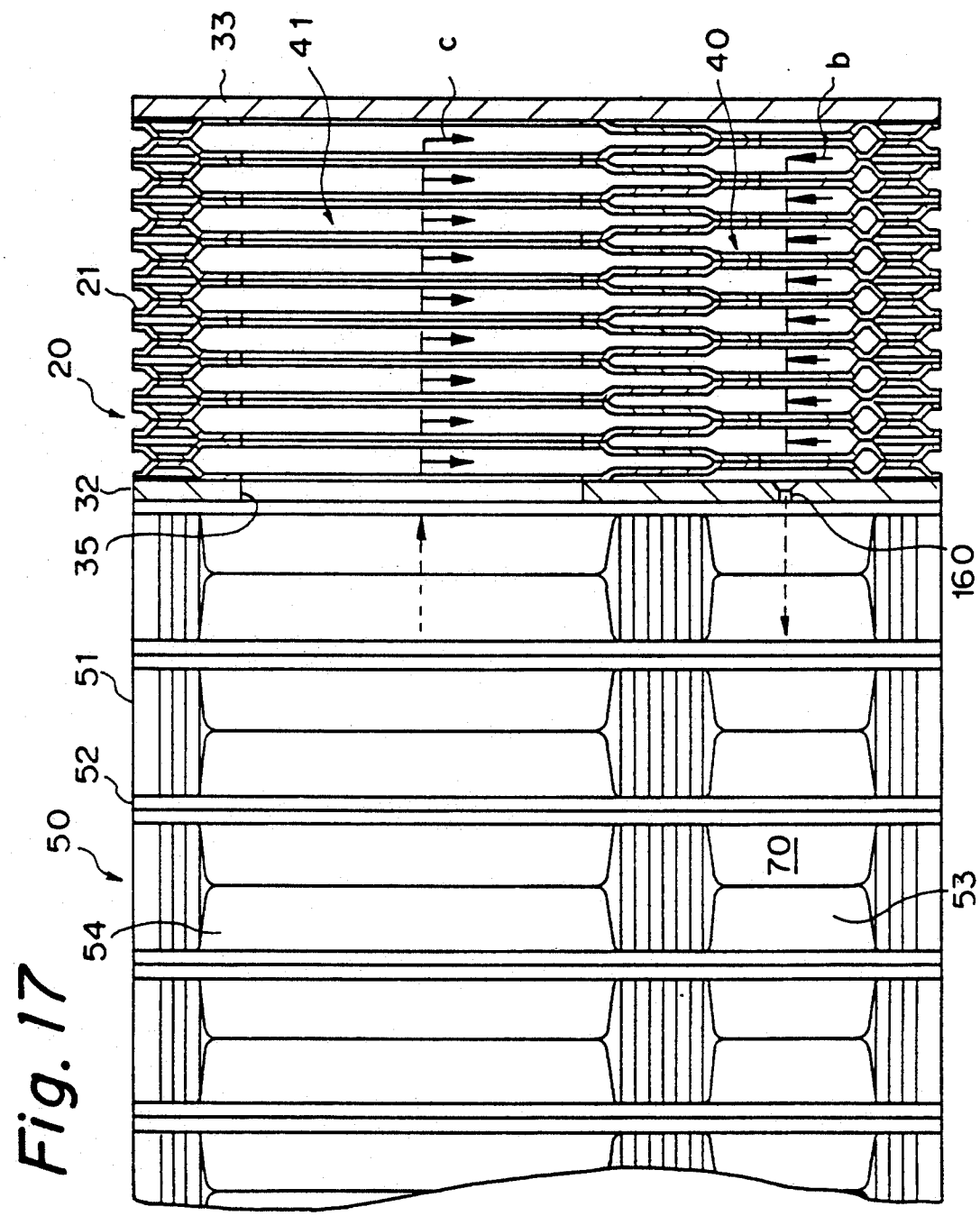
FIG. 17 is similar to FIG. 9 but is directed to a second embodiment of the present invention.
Figure 18:
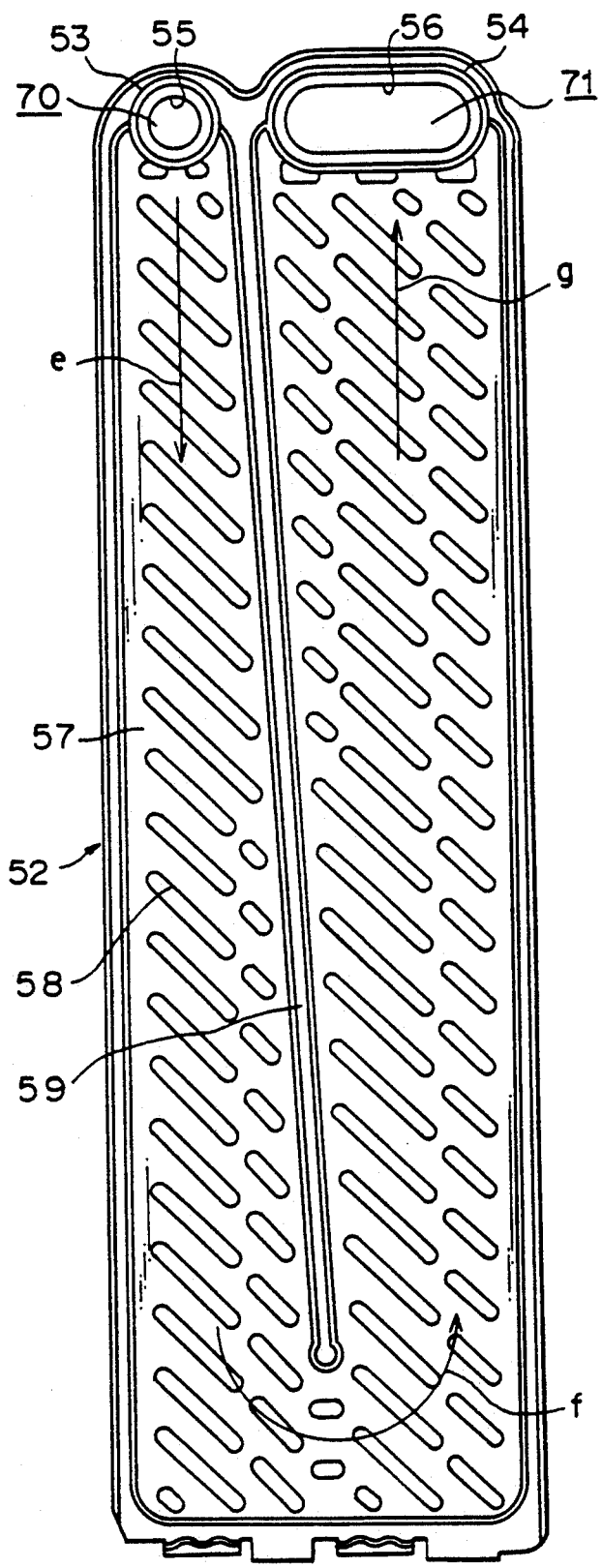
FIG. 18 is a front view of a plate of the evaporator in the second embodiment.
Figure 19:
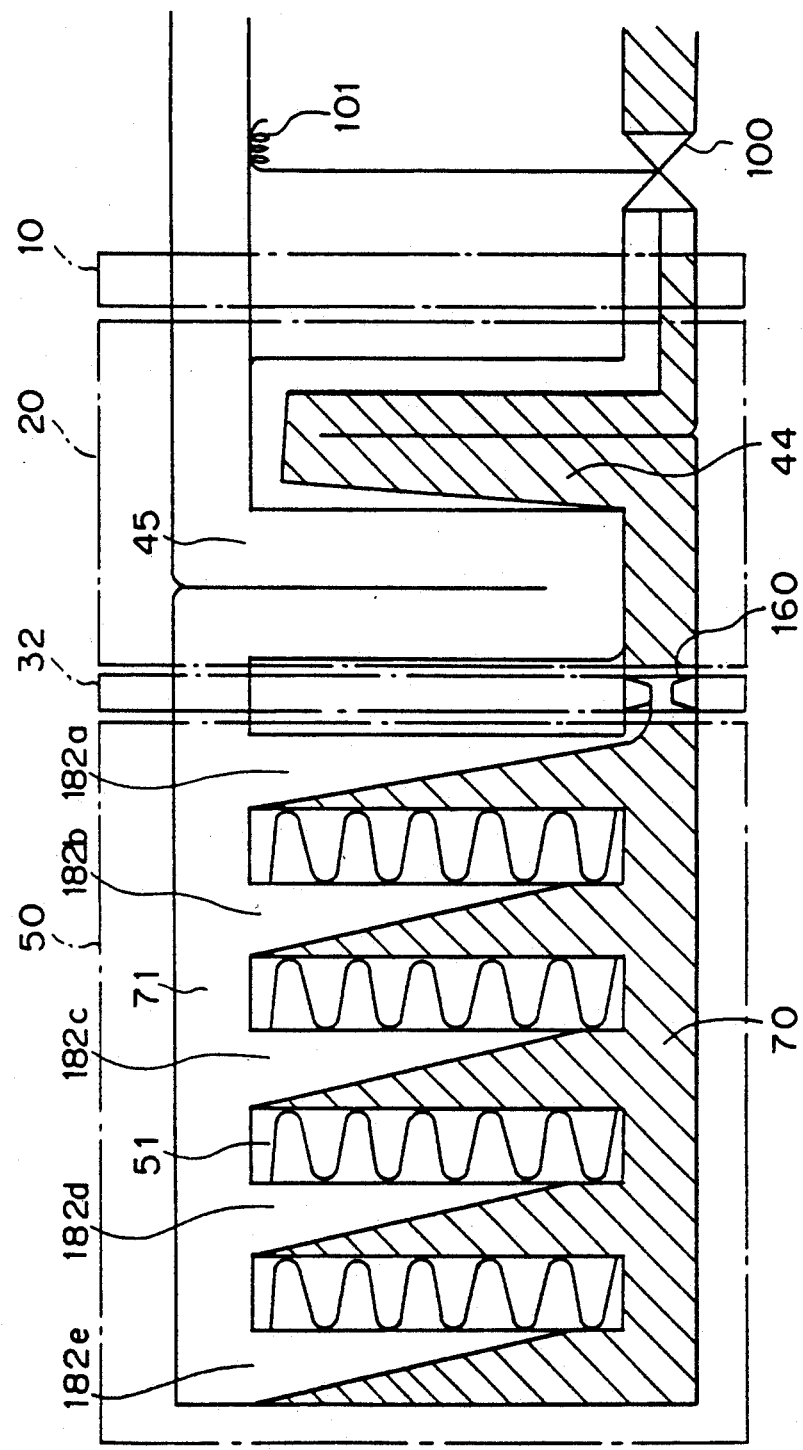
FIG. 19 is a diagrammatic view illustrating the operation of the second embodiment.

FIG. 17 to 20 show second and third embodiments of the present invention. In these embodiments, only the positions of the orifices are different from those in the first embodiment. The parts in these embodiments having functions similar to those in the first embodiment are designated by the same reference numbers. FIG. 17 19 shows a second embodiment, wherein a orifice 160 having an inner diameter of between 1.0 mm to 5.0 mm is arranged in an end plated 32 located between the refrigerant evaporating section 50 and the heat exchange section 20 in such a manner that the orifice 160 communicates with the top inlet refrigerant tank 40 of the heat exchange section 20 from the inlet passageways 44 with the inlet tank 70 of the evaporating section 50, as shown in FIG. 17. Therefore, unlike the first embodiment shown in FIG. 12, the plate 52 of the evaporating section 50 of the second embodiment shown in FIG. 18 is not provided with an orifice between the inlet tank 70 and the refrigerant passageway between the recess 57 of the inwardly facing plates 52. The provision of a single orifice 160 allows the inlet refrigerant introduced into the inlet tank portion 70 to reach a combined gas-linked state. In this case, inside the inlet tank portion 70, among a plurality of evaporating passageways 182a, 182b, 182c, 182d, 182e, etc., located at the top, most of the gaseous state refrigerant above the liquid state refrigerant is introduced into the evaporation passageway 182a or the evaporation passageways 182a and 182b located near the refrigerant inlet passageway 44 of the heat exchange section 20 (FIG. 19). Therefore, at the inlets of the remaining evaporation passageways, the refrigerant is mainly in the liquid state, similar to the first embodiment, so that an even supply of the inlet refrigerant to the evaporation passageways can be obtained. The even supply of the inlet refrigerant to the evaporation passageways allows the heat exchange efficiency to be increased. In addition, because the orifice 160 is provided only at single location a difficulty in maintaining a desired precision of the dimension of a plurality of orifices can be eliminated, which otherwise would make the amount of flow different between the evaporation passageways 182a, 182b, 182c, 182d, 182e, etc., causing the heat exchange efficiency to be worsened.

Figure 20:
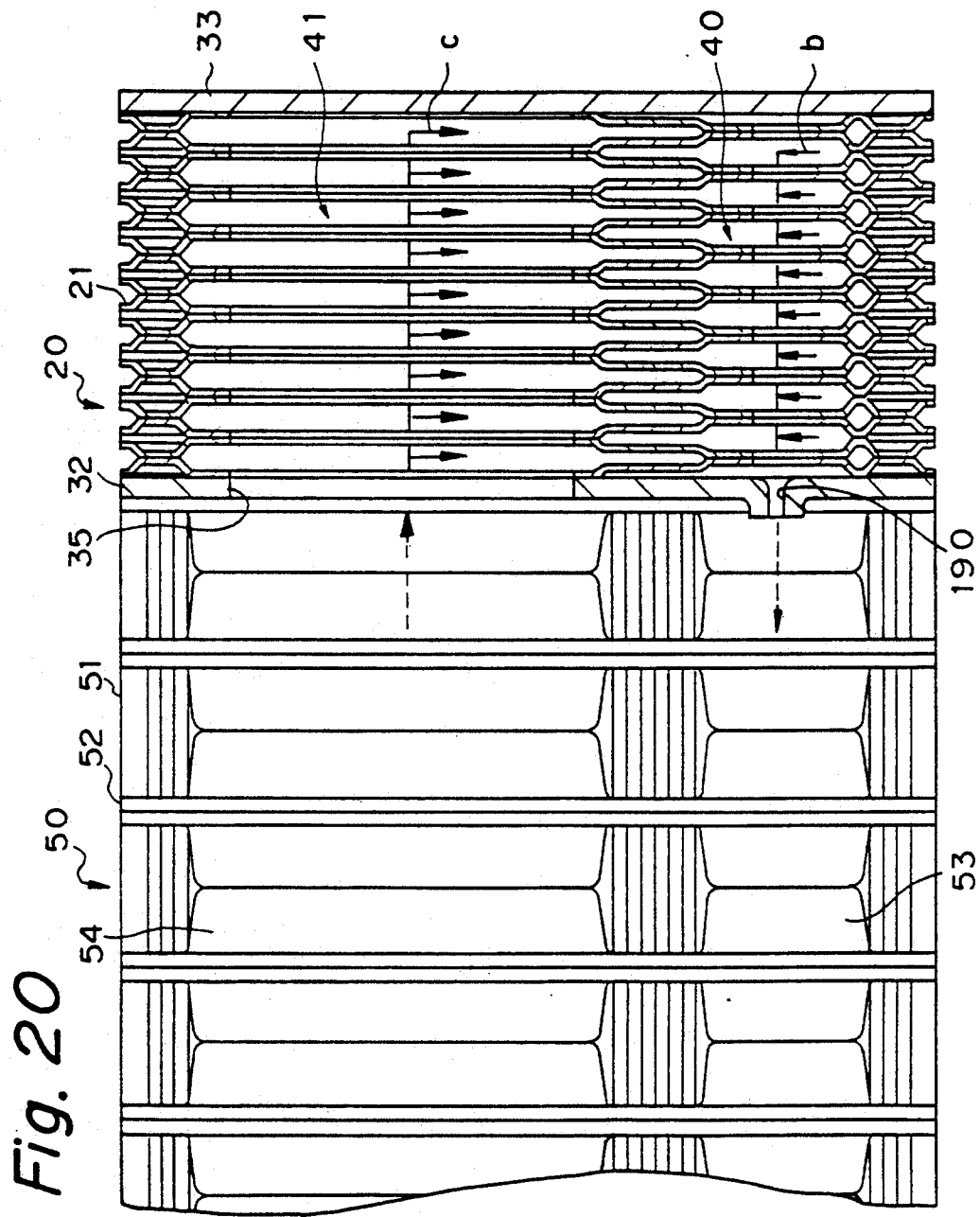
FIG. 20 is similar to FIG. 9 but is directed to a third embodiment.

FIG. 20 shows a third embodiment, wherein an orifice 190 in the partition wall 32 between the heat exchange section 20 and the evaporating section 50 has a nozzle shape and can eject a flow of the refrigerant into the tank 70 of the evaporating section 20. The remaining construction is the same as that of the second embodiment. Such shape of the orifice 190 in the third embodiment is advantageous in that there is a large distance between the heat exchange section 20 and the evaporating section 50, since a high speed flow of the refrigerant from the tank 40 of the heat exchange section 20 into the tank 70, even if it is spaced therefrom, is obtained.

Note, the evaporating section 50 and the heat exchange section 20 are formed as one body, but these sections can be separated and connected to each other by conduits. Namely, where used for an air conditioning apparatus for an automobile, the evaporating section 50 could be arranged inside a cabin, and the heat exchange section could be arranged outside of the cabin.

Figure 21:
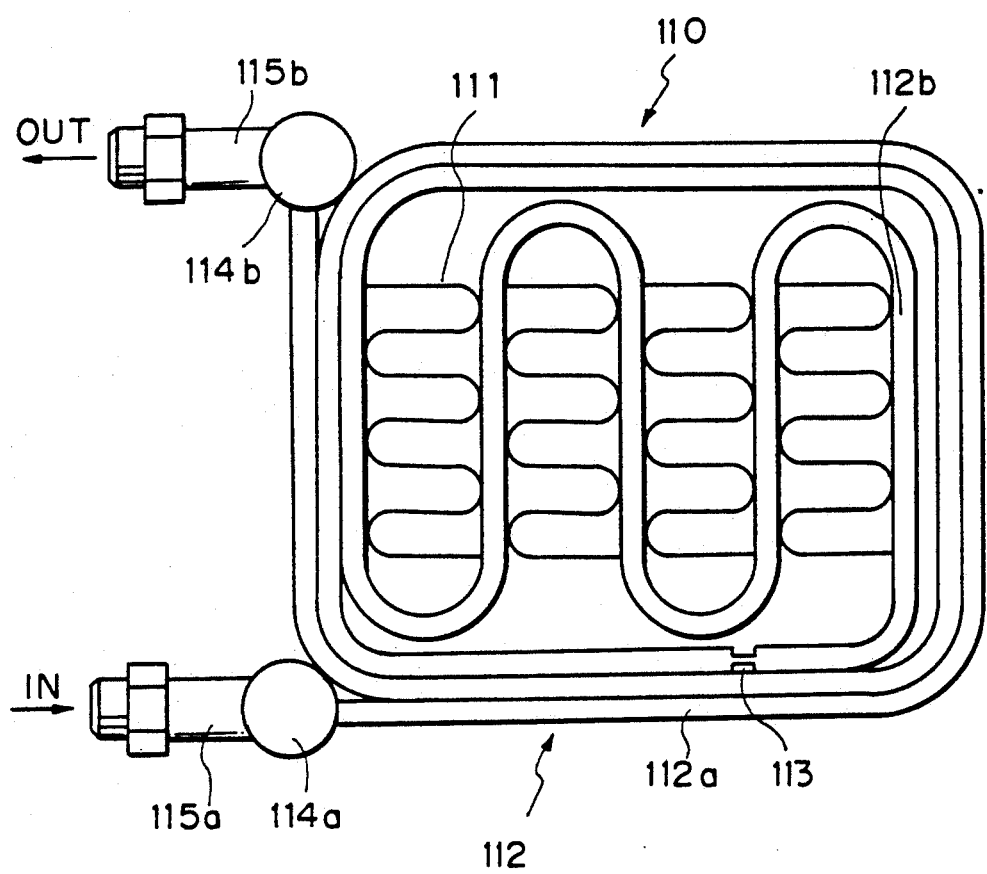
FIG. 21 is a plane view of the evaporator in a fourth embodiment.
Figure 23:
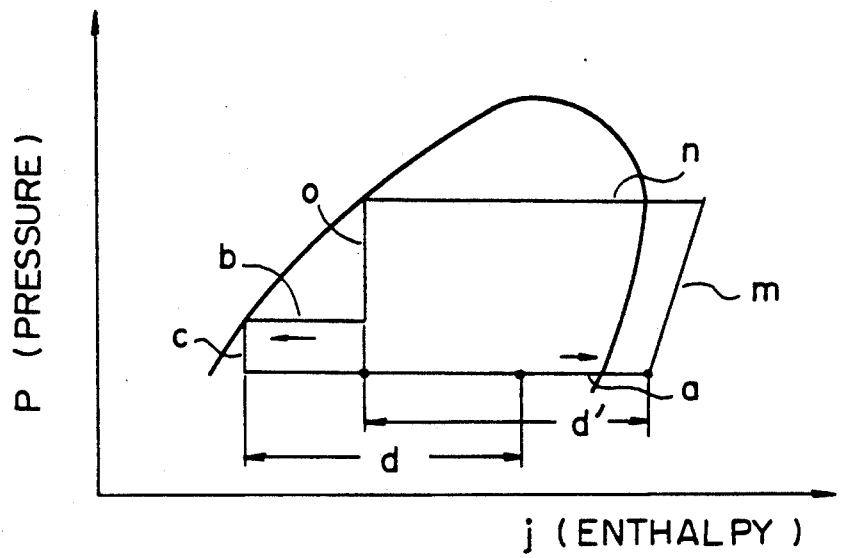
FIG. 23 is a Mollier chart illustrating the operation of the embodiment shown in FIG. 21.

FIG. 21 to 23 show a fourth embodiment directed to a serpentine type evaporator for an air conditioning apparatus for an automobile. The serpentine type evaporator has a tube with multi-passageways arranged therein in a serpentine fashion. In this serpentine type evaporator, the refrigerant is gasified before the refrigerant introduced at one end thereof reaches the other end of the tube, which reduces the efficiency of the evaporator. The recirculation system of the refrigerant for an air conditioning system requires that the refrigerant be fully evaporated, and thus a liquid state refrigerant must not returned to the compressor. Therefore, the air at the portion after gasification is cooled, and a result, a reduction of the efficiency of the evaporator is inevitable.

The fourth embodiment is directed to overcoming the above-mentioned drawback in the serpentine type evaporator by providing a construction wherein the outlet tube for the refrigerant is heated by the inlet tube for the refrigerant to obtain a super heated vapor so that the cooling of the air by the tube occurs only up to the location thereof at which the dehydration of the refrigerant occurs. The details of the fourth embodiment will be explained. FIG. 21 shows a evaporator 111 which, similar to the conventional serpentine type evaporator, includes fins 111, a tube 112 with multi-passageways therein, an inlet header 114a, an outlet header 114b, inlet pipe 115a, and an outlet pipe 115b. The tube 112 has an inlet portion 112a from the inlet header 114a and an outlet portion 112b to the outlet header 114b, these inlet and outlet portions 112a and 112b being in contact with each other. Note the portions of the inlet tube 112a and the outlet tube 112b in contact with each other are referred to as tube contacting portions. The outlet pipe 115b is connected, via a compressor, a condenser and an expansion valve, not shown, to the inlet pipe 115a. At the downstream end of the inlet 112a of the tube 112, the tube 112 is inwardly deformed to obtain an orifice 113. Note, the inlet tube 112a is a portion of the tube from the header 114a to the orifice 113, and the outlet tube 112b is a portion of the tube 112 from the orifice 113 to the outlet header 114b. The outlet tube 112b has a serpentine portion constructed by parallel straight sections connected by semicircular sections, between which straight sections fins 111 are arranged in contact therewith. Note, the serpentine portion of the outlet tube 112b in contact with the fins corresponds to the refrigerant passageways 80 of the refrigerant evaporating portion 50 of the first embodiment. The inlet tube 112a in contact with the outlet portion 112b corresponds to the inlet refrigerant passageway 44 of the heat exchange section 20 of the first embodiment.

The operation of the evaporator 111 of this embodiment will now be explained with reference to the Mollier chart shown in FIG. 23. The lines b, c, d and a illustrate the flow of the refrigerant at the evaporator. The line c shows an adiabatic expansion region due to the provision of the throttle 113, which allows the refrigerant to be subjected to the adiabatic expansion, whereby the refrigerant is gasified to obtain a low temperature thereof so that the temperature of the refrigerant at the inlet before gasification is higher than the temperature of the refrigerant at the outlet. As a result, the temperature of the refrigerant at the inlet tube 112a located at the refrigerant inlet side of the tube contacting portion is cooled by the refrigerant at the refrigerant at the outlet tube 112b, causing the refrigerant in the combined gas-liquid state to be changed to a liquid state. Contrary to this, the refrigerant in the outlet tube 112b located at the refrigerant outlet side of the tube contacting portion is heated by the refrigerant in the inlet tube 112a, so that the refrigerant is heated to obtain a superheated vapor. Namely, in the Mollier chart in FIG. 23, the line b corresponds to the tube contacting portion at the inlet side of the tube, and the line d corresponding to the portion of the air cooled by the fins 111. As a result, the tube contacting portion at the outlet is shown by a line a corresponding to the superheated condition, which prevents the refrigerant from being used for cooling the air, and thus provides an effective heat exchange. Note, the lines m, n and o in FIG. 23 correspond to m, n and o respectively, in FIG. 15, and therefore, a detailed explanation thereof will be omitted. Further, the line d' corresponds to the prior art.

Figure 24:
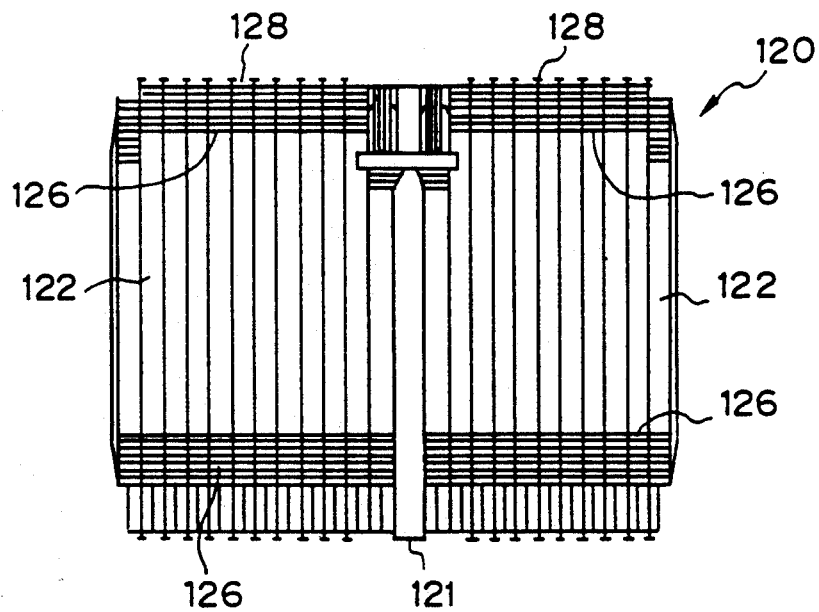
FIG. 24 is a front view of the evaporator in a fifth embodiment.
Figure 25:
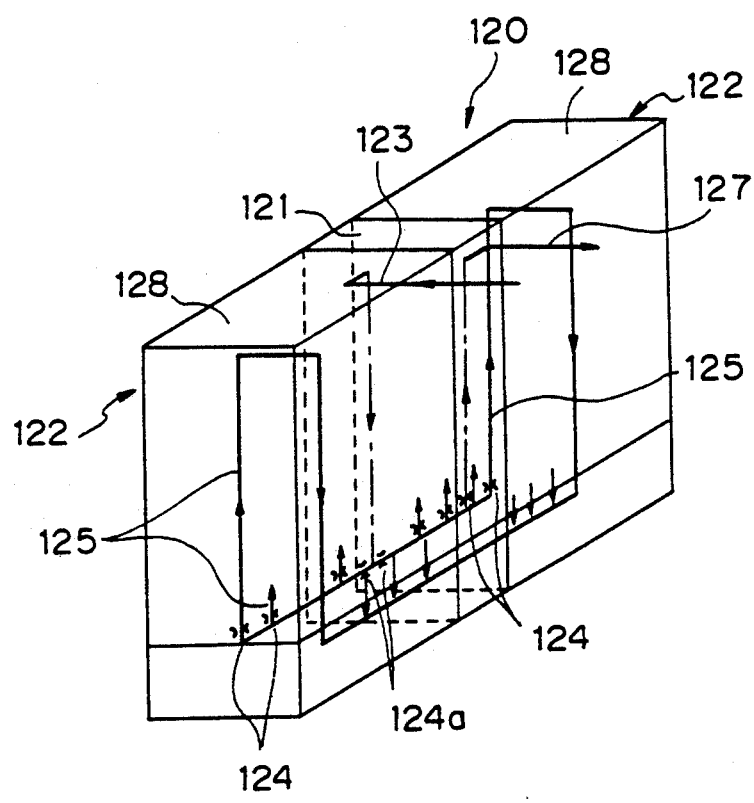
FIG. 25 is a schematic representation of the flows of refrigerant in the fifth embodiment shown in FIG. 24.

FIG. 24 and 25 show a fifth embodiment wherein, instead of arranging the evaporating section 50 on only one side of the heat exchange section 20 as in the first embodiment as shown in FIG. 1, heat exchange sections 128 are arranged on both sides of the heat exchange section 121. The first embodiment wherein the evaporating section 50 is arranged only on one side of the heat exchange section 20 as shown in FIG. 1 makes an arrangement of conduits for the evaporator complicated when the conduits are taken from the evaporator at the center portion of the core portion. Furthermore, because the inlet refrigerant from the side of the evaporator section 202 is divided into branch passageways in the evaporator section 202, and the core portion has a long length, the refrigerant is unevenly introduced into the branch passageways, and thus the efficiency of the evaporator is worsened.

To eliminate the above difficulty, the fifth embodiment shown in FIGS. 24 and 25 provides an evaporator having a high efficiency, and obtains an introduction of an even amount of refrigerant to each branch passageway of the refrigerant evaporating section. The evaporator 120 in the fifth embodiment shown in FIGS. 24 and 25 is provided with a heat exchange section 121 and refrigerant evaporating sections 122 arranged on both sides of the heat exchange section 121. The heat exchange section 121 is provided with an inlet passageway 123, divided at the bottom thereof into two sections, in the right-hand and left-hand directions, which are connected to the respective refrigerant evaporating sections 122, and are connected to branched refrigerant evaporation passageways 125 via respective orifices 124. The branched refrigerant evaporation passageways 125 are provided with fins 126, and each of the branched refrigerant evaporation passageways 125 moves upward in the refrigerant evaporation section 122, and changes the direction of the movement thereof downward. As a result, the flows are combined at the bottom of the refrigerant evaporating section 122, and are directed into an outlet passageway 127 in the heat exchange section 121, the passageway 127 being connected to a compressor (not shown). The inlet passageway 123 and outlet passageway 127 are arranged adjacent to each other, to obtaining a heat exchange therebetween. The operation of the evaporating section is similar to that of the first embodiment, and therefore, and explanation thereof is omitted. Note, instead of providing the orifices 124 at the inlets of the respective branched passageways 125, common orifices 124a can be provided at the left-hand and right-hand portions of the passageways after they are branched from the inlet passageway 123.

Figure 26:
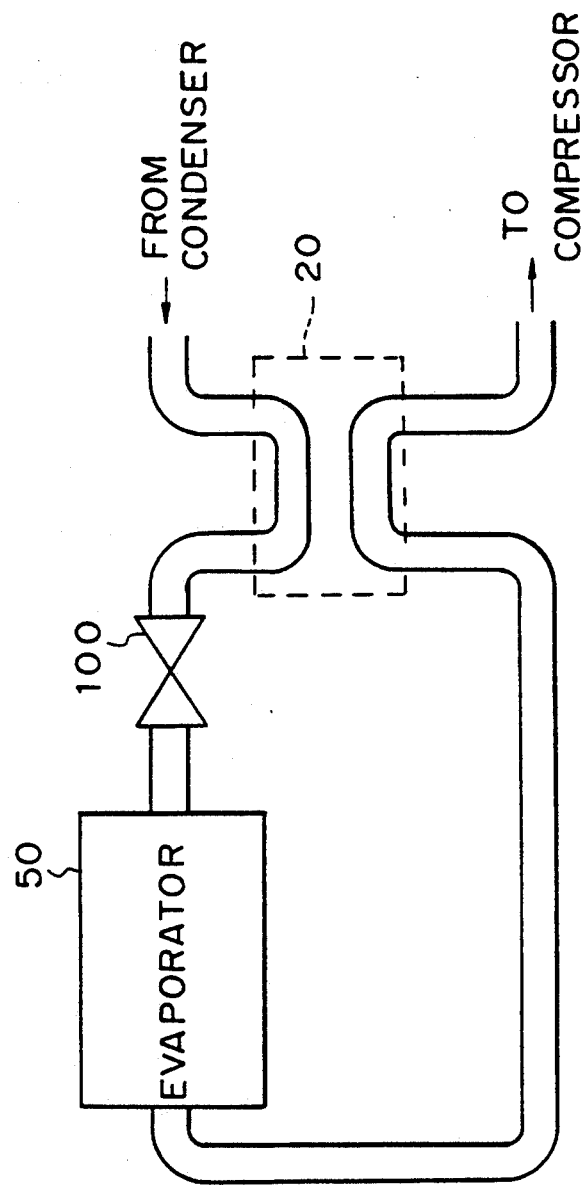
FIG. 26 is a schematic illustration of another embodiment.
Figure 27:
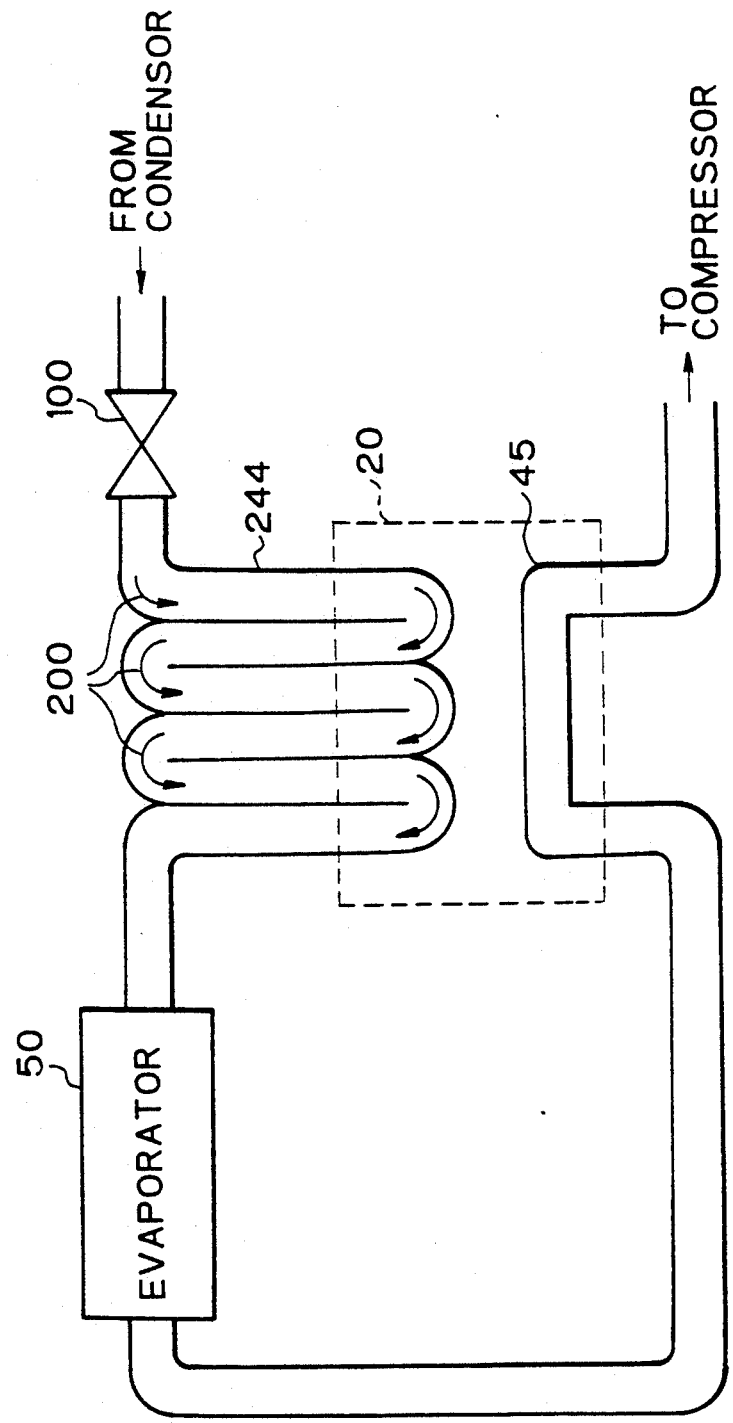
FIG. 27 shows another embodiment wherein a serpentine pipe is employed for obtaining a pressure reduction of the refrigerant.

The length of the core portion 128 of the evaporating section 122 of the evaporator 120 according to the embodiment in FIGS. 24 and 25 can be a half of that of the prior art shown in FIGS. 26 and 27, and thus this embodiment allows the refrigerant from the inlet passageway 123 to be evenly supplied to the branched evaporation passageways 125, resulting in an increase in the efficiency of the evaporator. As another advantage, an addition of heat exchange section for a mutual heat exchange of the inlet and outlet refrigerant with respect to a conventional evaporator taken out of a central pipe allows the number of turns of the refrigerant in the evaporator to be reduced, resulting in a reduction of the pressure loss, and thus increasing the efficiency of the evaporator.

In the above embodiments, the refrigerant from the expansion valve is subjected to a heat exchange with the refrigerant from the evaporator, but as a modification, the refrigerant before being introduced into the expansion valve 100 can be subjected to a heat exchange with the refrigerant from the evaporator, as shown in FIG. 26, at the heat exchange section 20. The heat exchange section 20 is arranged to obtain a heat exchange between the refrigerant flowing from the condenser to the expansion valve 100 and the refrigerant flowing from the evaporator 50 to the compressor.

In another embodiment shown in FIG. 27, a serpentine structure of an inlet passageway 244 from the expansion valve 100 is employed for reducing the pressure of the refrigerant introduced into the evaporator. The inlet passageway has serpentine structure wherein a plurality of changes of the direction of the flow of the refrigerant occur at turning points as shown by arrows 200, to obtain a longer flow path for the refrigerant before it is introduced into the evaporator 50. Due to this pressure reduction, a gas-liquid combined state of the refrigerant is obtained before it is introduced into the evaporator. The inlet passageway 244 is arranged so that a heat exchange of the refrigerant occurs with respect to the refrigerant in the outlet passageway 45 from the evaporator 50, to thereby obtain a superheated condition of the refrigerant in the outlet passageway 45.

Figure 28:
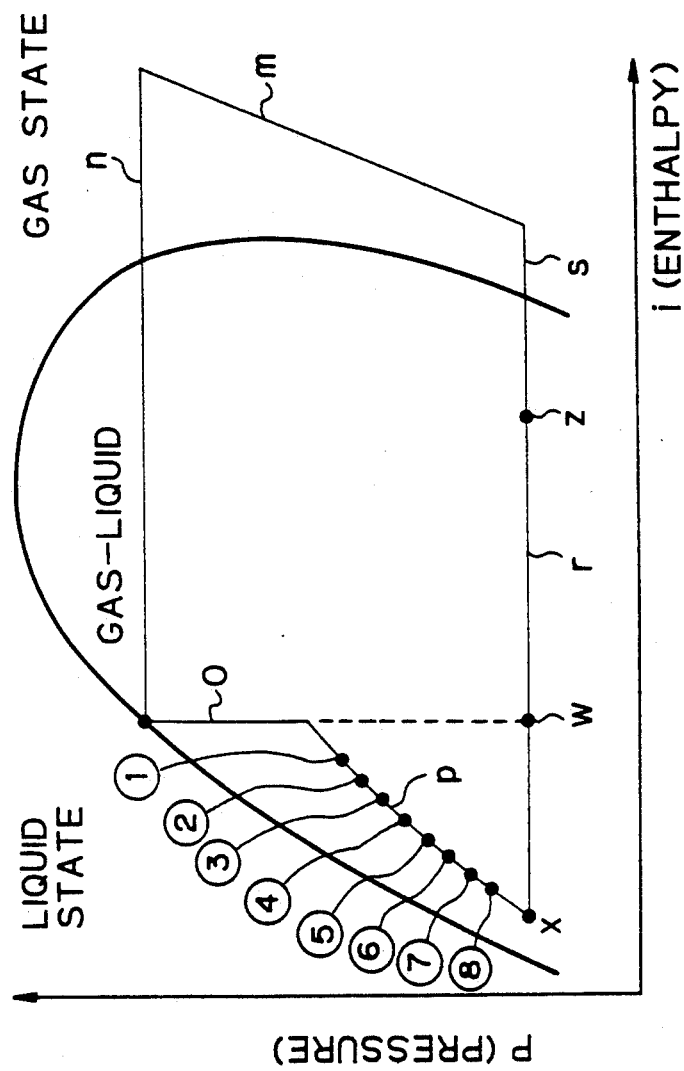
FIG. 28 shows a Mollier chart illustrating the operation of the embodiment in FIG. 27.
Figure 29:
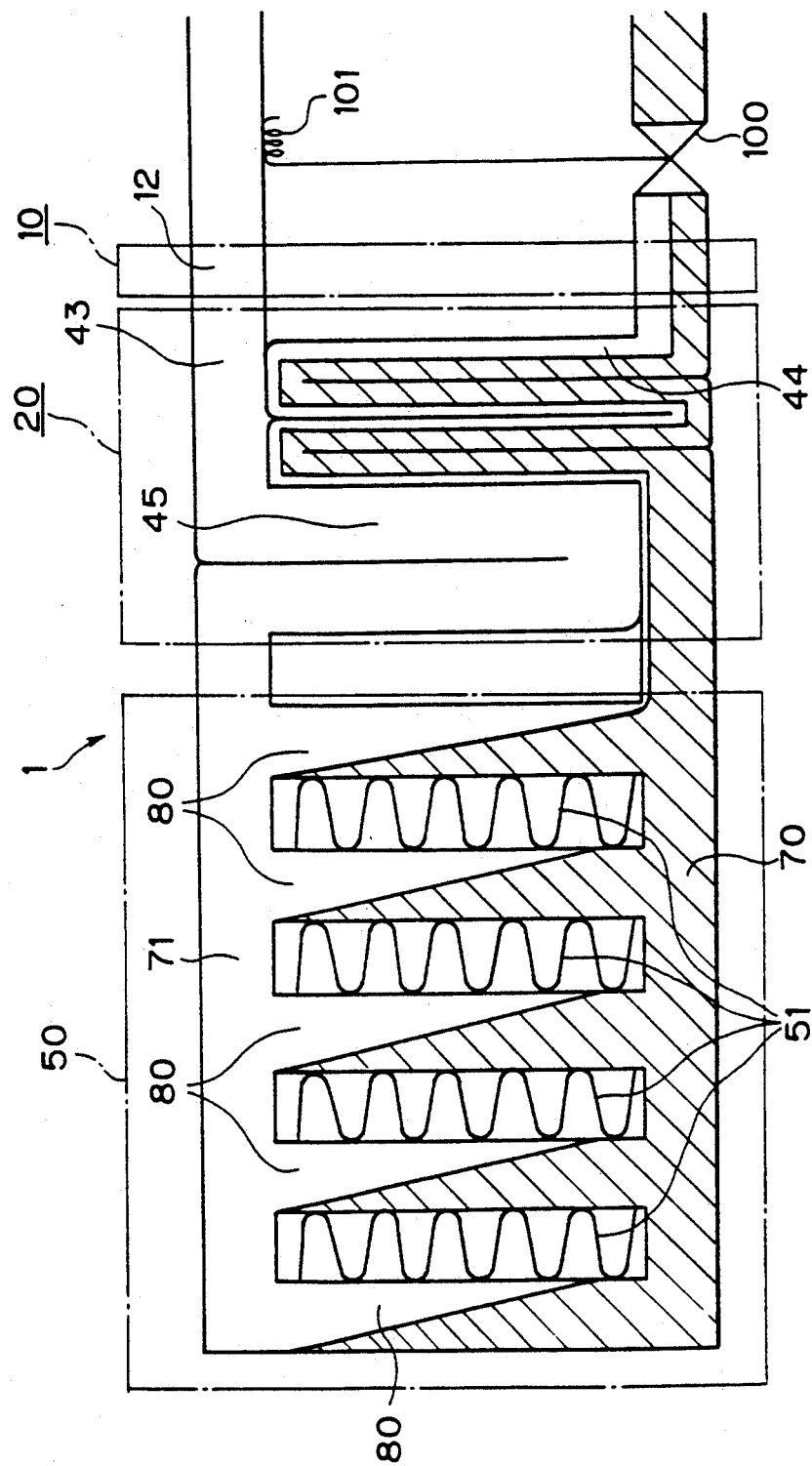
FIG. 29 is similar to FIGS. 1 or 19 but is a diagrammatic view illustrating the operation in the embodiment in FIG. 27.

The operation of the embodiment shown in FIG. 27 is explained with reference to a Mollier diagram in FIG. 28. After the radiation at the condenser (line n), the state of the refrigerant subjected to the compression (line m) by the compressor is changed from a gas state to a liquid state. In a usual refrigerating cycle, the liquid state refrigerant is subjected to an evaporation process up to a point w along a line o in FIG. 28, to obtain a refrigerant in a combined gas-liquid state which is introduced into the evaporator section 50, which prevents the refrigerant from being evenly introduced to the evaporator section 50. Contrary to this, in the embodiment in FIG. 27, the refrigerant from the expansion valve 100 is subjected to repeated changes of the direction of the flow at the inlet passageway 244 which increase the pressure loss across the passageway 244, and thus the pressure of the refrigerant is gradually reduced as the directional changes of the flow occur at the respective turning points. At the same time, the refrigerant is subjected to a cooling by a low temperature refrigerant in the passageway 45 at the heat exchange section 20. Numerals 1 through 8, as circled on line p in FIG. 28, illustrate such a reduction of the pressure toward a point x, which occurs at each turning point, while the temperature of the refrigerant is reduced. As a result, as schematically shown in FIG. 29, almost all of the gaseous state refrigerant is introduced into the evaporation passageways 80 near the heat exchange section 20. As a result, almost all of the remaining evaporation passageways 80 can receive liquid state refrigerant, thereby permitting the refrigerant to be evenly distributed along the entire portion of the evaporating portion 50. Furthermore, a heat exchange occurs between the refrigerant in the inlet passageway 44 and the refrigerant in the outlet passageway 45, to thus obtain a superheated condition of the refrigerant in the outlet passageway 45.

Figure 30:
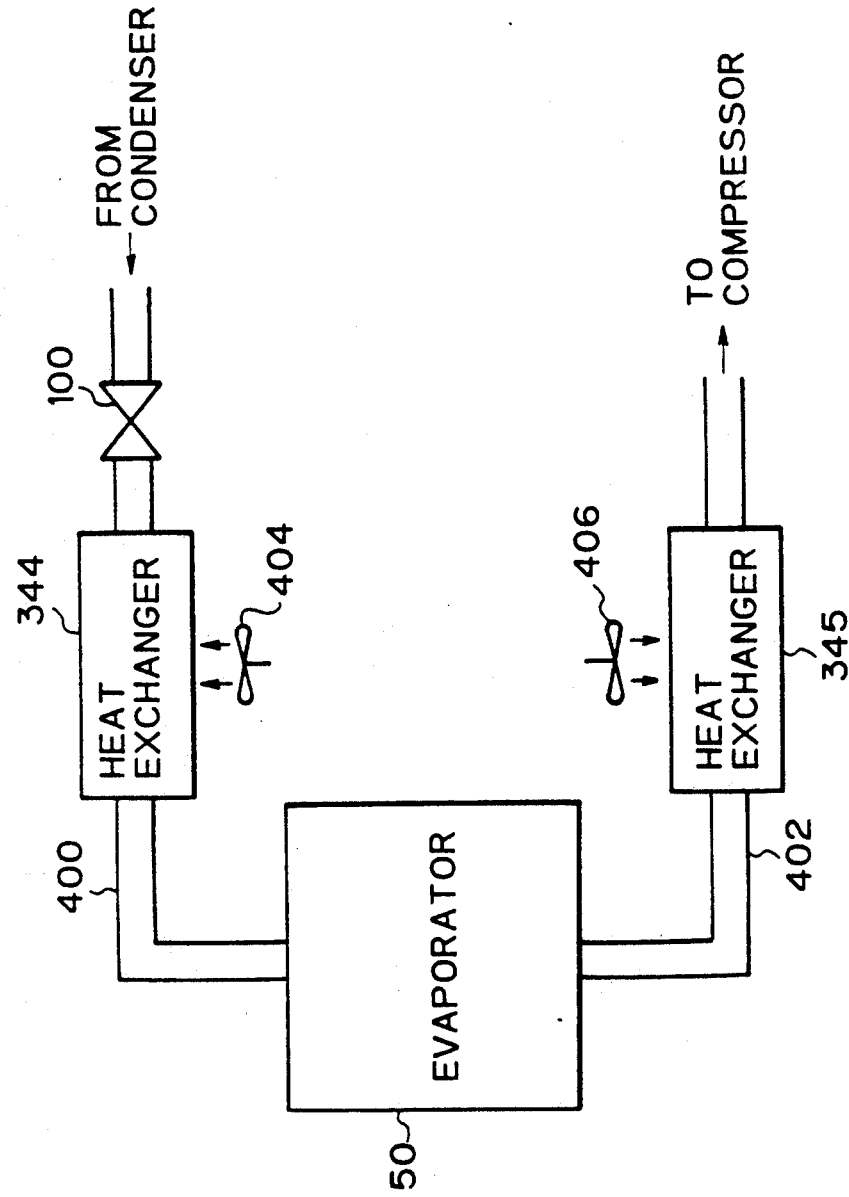
FIG. 30 is a diagrammatic view of another embodiment.

FIG. 30 shows still another embodiment, wherein a heat exchanger 344 is arranged in a passageway 400 from the expansion valve 100 to the evaporator 50 and another heat exchanger 345 is arranged in a passageway 402 from the evaporator 50 to a compressor. A first fan 404 is arranged adjacent to the heat exchanger 344, for cooling the refrigerant introduced into the evaporator and obtaining a liquid state of the refrigerant. A second fan 406 is arranged adjacent to the heat exchanger 344, for heating a combined gas-liquid state of the refrigerant to obtain a superheated condition of the refrigerant before it is introduced into the compressor.

In the embodiments, orifices, an expansion valve, or a serpentine passageway, are used for reducing the pressure of the cooling medium introduced into the evaporating section, but in place of these means, other equivalent means such as capillaries may be used.

Although the present invention is described with reference to the attached drawings, many modifications and changes can be made by those skilled in this art without departing from the scope and spirit of the invention.

We claim:

1. An evaporator adapted for use in a refrigerating cycle for a refrigerant, comprising:

an inlet for introduction of the refrigerant to be evaporated;

an outlet for removal of the refrigerant after evaporation;

an inlet passageway having a predetermined length and connected to the inlet for allowing a flow of the refrigerant from the inlet;

evaporating means connected to the inlet passageway for obtaining a heat exchange between the refrigerant inside and a fluid outside the evaporating means, for an evaporation of the refrigerant therein;

first pressure reducing means arranged upstream from said inlet passageway for throttling the flow of the refrigerant to the inlet passageway for reducing a pressure of the refrigerant flowing into the inlet passageway;

second pressure reducing means arranged between the inlet passageway and said evaporating means for reducing a pressure of the refrigerant flowing into the evaporating means;

an outlet passageway having a predetermined length and connected to the outlet, for allowing a flow of the refrigerant while in a combined gas-liquid state from the evaporating means;

first heat exchanging means arranged in the inlet passageway for cooling the refrigerant between said first and second pressure reducing means to obtain a liquid state thereof before the refrigerant is introduced into the pressure reducing means, and second heat exchanging means arranged in the outlet passageway for heating the refrigerant under a combined gas-liquid state to a superheated state.

2. An evaporator according to claim 1, wherein said first and second heat exchanging means are arranged in such a manner that a heat exchange occurs between the refrigerant in the inlet passageway and the refrigerant in the outlet passageway.

3. An evaporator according to claim 1, wherein said first and second heat exchanging means are separately constructed in such a manner that the cooling of the refrigerant at the first heat exchanging means and the heating of the refrigerant at the second heat exchanging means take place independently.

4. An evaporator adapted for use in refrigerating cycle for a refrigerant, comprising:
- an inlet for introduction of the refrigerant to be evaporated;
- an outlet for removal of the refrigerant after evaporation;
- an inlet passageway having a predetermined length and connected to the inlet for allowing a flow of the refrigerant from the inlet;
- evaporating means connected to the inlet passageway for obtaining a heat exchange between the refrigerant inside and a fluid outside the evaporating means, for an evaporation of the refrigerant therein;
- first pressure reducing means arranged upstream from said inlet passageway for throttling the flow of the refrigerant to the inlet passageway for reducing a pressure of the refrigerant flowing into the inlet passageway;
- second pressure reducing means arranged between the inlet passageway and the evaporating means for throttling the flow of the refrigerant from the inlet passageway to the evaporating means, to thereby reduce a pressure of the refrigerant flowing into the evaporating means;
- an outlet passageway having a predetermined length and connected to the outlet, for allowing a flow of the refrigerant while in a combined gas-liquid state from the evaporating means;
- the inlet and outlet passageways being arranged close to each other in such a manner that the refrigerant in the outlet passageway is heated by the refrigerant in the inlet passageway, whereby the refrigerant in the outlet passageway is brought to a superheated vaporized state.

5. An evaporator according to claim 4, wherein said evaporating means comprise a plurality of stacked plates, each of said plates having a first tubular projection, a second tubular projection, and a recess, each of an adjacent pair of said plates being arranged such that said first and said second tubular projections and said recess, respectively, face inward, whereby an inlet tank is formed inside said first projection and an outlet tank is formed inside said second projection, and such that a plurality of evaporation passageways are formed by said recess, said evaporation passageways connecting the inlet tank with the outlet tank, and outside air being passed between said adjacent pairs of plates.

6. An evaporator according to claim 5, wherein the evaporating means further comprises a plurality of fins arranged between said adjacent pairs of plates, such that the outside air flow is in contact with the fins.

7. An evaporator according to claim 4, wherein the evaporating means comprise a pipe having a serpentine shape composed of a plurality of parallel sections, and curved sections connecting adjacent parallel sections.

8. An evaporator adapted for use in a refrigerating cycle for a refrigerant, comprising,
- an inlet for introduction of the refrigerant to be evaporated;
- an outlet for removal of the refrigerant after evaporation;
- an inlet passageway having a predetermined length and connected to the inlet for allowing a flow of the refrigerant from the inlet;
- a plurality of evaporating passageways connected to the inlet passageway for obtaining a heat exchange between the refrigerant inside the evaporating passageway and a fluid outside the evaporating passageway, to thereby evaporate the refrigerant therein;
- first pressure reducing means arranged upstream from said inlet passageway for throttling the flow of the refrigerant to the inlet passageway for reducing pressure of the refrigerant flowing into the inlet passageway;
- second pressure reducing means arranged between the inlet passageway and the evaporating passageway for throttling the flow of the refrigerant from the inlet passageway to the evaporating passageways, to thereby reduce the pressure of the refrigerant in the evaporating passageways, and;
- an outlet passageway having a predetermined length and connected to the outlet for providing a flow of the refrigerant while in a combined gas-liquid state from the evaporating passageway;
- the inlet and outlet passageways being arranged close with each other so that the refrigerant in the outlet passageway is heated by the refrigerant in the inlet passageway, whereby the refrigerant can be brought to a superheated vapor state in the outlet passageway.

9. An evaporator according to claim 8, wherein said pressure reducing means comprise an orifice arranged upstream of the evaporating passageway.

10. An evaporator according to claim 8, wherein said pressure reducing means comprise a plurality of orifices arranged in the respective evaporating passageways.

11. An evaporator adapted for use in a refrigerating cycle for a refrigerant, comprising:
- an inlet for introduction of the refrigerant to be evaporated;
- an outlet for removal of the refrigerant after evaporation;
- an inlet passageway having a predetermined length and connected to the inlet for allowing a flow of the refrigerant from the inlet;
- evaporating means connected to the inlet passageway for obtaining a heat exchange between the refrigerant inside and a fluid outside the evaporating means, for an evaporation of the refrigerant therein;
- an inlet passageway having a serpentine portion for providing a number of changes of a direction of a flow of the refrigerant, to thereby reduce a pressure of the refrigerant flowing into the evaporating means;
- an outlet passageway having a predetermined length and connected to the outlet, for allowing a flow of the refrigerant while in a combined gas-liquid state from the evaporating means;
- first pressure reducing means arranged upstream from said inlet passageway for throttling the flow of the refrigerant to the inlet passageway for reducing pressure of the refrigerant flowing into the inlet passageway; and
- second pressure reducing means arranged between the inlet passageway and said evaporating means for reducing of the refrigerant flowing into the evaporating means;
- the inlet at said serpentine portion and outlet passageways being arranged close to each other in such a manner that the refrigerant in the outlet passageway is heated by the refrigerant in the inlet passageway, whereby the refrigerant in the outlet passageway is brought to a superheated vaporized state.

12. An evaporator adapted for use in a refrigerating cycle having an expansion valve, comprising:
an inlet for an introduction of the refrigerant to be evaporated;
an outlet for a removal of the refrigerant after evaporation;
said inlet being located downstream of the expansion valve, for receiving the refrigerant from the expansion valve;
an inlet passageway having a predetermined length and connected to the inlet for providing a flow of the refrigerant from the inlet;
evaporating means connected to the inlet passageway for obtaining a heat exchange between the refrigerant from the inlet passageway and a fluid outside the evaporating means, to thereby evaporate the refrigerant therein;
first pressure reducing means arranged upstream from said inlet passageway for throttling the flow of the refrigerant to the inlet passageway for reducing a pressure of the refrigerant flowing into the inlet passageway;
second pressure reducing means arranged between the inlet passageway and the evaporating means for throttling the flow of the refrigerant from the inlet to a passageway adjacent to the evaporating passageway, for reducing the pressure of the refrigerant flowing into the evaporating mans, and;
an outlet passageway having a predetermined length and connected to the outlet, for allowing a flow of the refrigerant, while in a combined gas-liquid state from the evaporating passageway;
the inlet and outlet passageways being arranged close to each other in such a manner that the refrigerant in the outlet passageway is heated by the refrigerant in the inlet passageway, whereby the refrigerant is brought to a superheated vaporized state in the outlet passageway.

13. A refrigerating system comprising:
a recirculating line for a refrigerant;
a compressor arranged on the recirculation line for compressing the refrigerant;
a condenser arranged on the recirculation line downstream of the compressor for condensing the refrigerant in a gaseous state and having a high pressure and a high temperature from the compressor;
an expansion valve arranged on the recirculation line downstream of the condenser, for subjecting the refrigerant to an adiabatic expansion process;
an evaporator arranged on the recirculation line downstream of the condenser, for vaporizing the refrigerant having a reduced pressure after expansion;
pressure reducing means arranged on the recirculation line between said expansion valve and said evaporator for reducing a pressure of the refrigerant from the expansion valve to the evaporator, and;
a heat exchange device for obtaining a heat exchange of the refrigerant between the expansion valve and the pressure reducing means with the refrigerant after it is evaporated by the evaporator when in a gas-liquid state and before becoming a completely saturated gas.

14. An evaporator adapted for use in a refrigerating cycle for a refrigerant, comprising:
an inlet for an introduction of the refrigerant to be evaporated;
an outlet for a removal of the refrigerant after evaporation;
heat exchange means having a plurality of an inlet passageways having a predetermined length and connected to the inlet for allowing a flow of the refrigerant from the inlet;
evaporating means for obtaining a heat exchange between the refrigerant from the inlet passageways and a fluid outside the evaporating means, to thereby evaporate the refrigerant therein;
first pressure reducing means arranged upstream from said inlet passageway for throttling the flow of the refrigerant to the inlet passageway for reducing a pressure of the refrigerant flowing into the inlet passageway; and
second pressure reducing means located between the inlet passageway and the evaporating means, for throttling the flow of the refrigerant from the inlet passageway to the evaporating means to thereby reduce the pressure of the refrigerant flowing into the evaporating means;
said heat exchange means further having a plurality of outlet passageways having a predetermined length for allowing a flow of the refrigerant from the evaporating passageways;
the inlet and outlet passageways being arranged close to each other such that the refrigerant in the outlet passageway is heated by the refrigerant in the inlet passageway, whereby the refrigerant is brought to a superheated vaporized state in the outlet passageway.

15. An evaporator according to claim 14, wherein said heat exchange means comprise a plurality of stacked plates, each of said plates having first and second portions outwardly projected therefrom and third and fourth portions opposingly projected therefrom, the first, second, third and fourth portions forming first, second, third and fourth openings, respectively, and a corrugated section at an area of each of the plates other than of the first, second, third and fourth projected portions, adjacent plates being arranged to be opposingly faced so that inlet passageways are formed between the facing plates at the corrugated portion, and the outlet passageways are formed between adjacent plates opposite the inlet passageway, the first and the second openings of the plates being in communication with the inlet passageways, and the third and the fourth openings of the plates being in communication with the outlet passageways.

16. An evaporator adapted for use in a refrigerating cycle for a refrigerant, comprising:
a joint block having an inlet for an introduction of the refrigerant to be evaporated and an outlet for a removal of the refrigerant after evaporation;
a heat exchange section having at least one passageway having a predetermined length, and connected to the inlet for allowing a flow of the refrigerant from the inlet and;
first pressure reducing means arranged in the refrigerating cycle for reducing the pressure of the refrigerant;
an evaporating section disposed downstream from the first pressure reducing means, having at least one evaporation passageway connected to the inlet passageway, for obtaining a heat exchanged between the refrigerant from the inlet passageway and a fluid outside the evaporating means to thereby evaporate the refrigerant therein, and at least one orifice arranged between the inlet passageway and the evaporating passageway for throttling the flow of the refrigerant from the inlet passageway to the evaporating means, to thereby reduce the pressure of the refrigerant flowing into the evaporating means;

said heat exchange section further having at least one outlet passageway having a predetermined length and connected to the outlet, for allowing a flow of the refrigerant while in a combined gas-liquid state from the evaporating means;

the inlet and outlet passageways being arranged close to each other such that the refrigerant in the outlet passageway is heated by the refrigerant in the inlet passageway, whereby refrigerant is brought to a super heated vaporized state in the outlet passageway.

17. An evaporator according to claim 16, wherein said joint block, said heat exchange section and said evaporating sections are connected to each other to thereby form an assembled evaporator.

18. An evaporator according to claim 16, further comprising a second evaporating section having at least one evaporation passageway connected to the inlet passageway for obtaining a heat exchange between the refrigerant from the inlet passageway and a fluid outside the evaporating means, for evaporating the refrigerant therein, and at least one orifice arranged between the inlet passageway and the evaporating passageway for throttling the flow of the refrigerant from the inlet passageway to the evaporating means, to thereby reduce the pressure of the refrigerant flowing into the evaporating means, and at least one outlet passageway having a predetermined length and connected to the outlet, for providing a flow of the refrigerant in a combined gas-liquid state from the evaporating means, the inlet and outlet passageways of the second evaporating section being arranged close to each other so that the refrigerant in the outlet passageway is heated by the refrigerant in the inlet passageway, whereby the refrigerant is brought to a superheated vaporized state in the outlet passageway.

19. An evaporator according to claim 18, wherein the first and second evaporator sections are arranged on opposite sides of the heat exchange section.

20. An evaporator adapted for use in a refrigerating cycle for a refrigerant, comprising:

an inlet for an introduction of the refrigerant to be evaporated;

an outlet for a removal of the refrigerant after evaporation;

heat exchange means having a plurality of an inlet passageways having a predetermined length and connected to the inlet, for allowing a flow of the refrigerant from the inlet;

evaporating means for obtaining a heat exchange between the refrigerant from the inlet passageways and a fluid outside the evaporating means, to thereby evaporate the refrigerant therein, and;

pressure reducing means located between the inlet passageway and the evaporating means, for throttling the flow of the refrigerant from the inlet passageway to the evaporating means to thereby reduce the pressure of the refrigerant flowing into the evaporating means;

said heat exchange means further having a plurality of outlet passageways having a predetermined length for allowing a flow of the refrigerant from the evaporating passageways;

the inlet and outlet passageways being arranged close to each other such that the refrigerant in the outlet passageway is heated by the refrigerant in the inlet passageway, whereby the refrigerant is brought to a superheated vaporized state in the outlet passageway, said heat exchange means comprising a plurality of stacked plates, each of said plates having first and second portions outwardly projected therefrom and third and fourth portions opposingly projected therefrom, the first, second, third and fourth portions forming first, second, third and fourth openings, respectively, and a corrugated section at an area of each of the plates other than the first, second, third and fourth projected portions, adjacent plates being arranged to be opposingly faced so that inlet passageways are formed between the facing plates at the corrugated portion, and the outlet passageways being formed between adjacent plates opposite the inlet passageway, the first and the second openings of the plates being in communication with the inlet passageways, and the third and the fourth openings of the plates being in communication with the outlet passageways.

* * * * *